*(12)* United States Patent
Jones, IV et al.

(10) Patent No.: US 9,288,096 B2
(45) Date of Patent: Mar. 15, 2016

(54) ENABLING PHASE TRACKING FOR A COMMUNICATION DEVICE

(75) Inventors: Vincent Knowles Jones, IV, Redwood City, CA (US); Hemanth Sampath, San Diego, CA (US); Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 762 days.

(21) Appl. No.: 12/961,000

(22) Filed: Dec. 6, 2010

(65) Prior Publication Data

US 2011/0134899 A1 Jun. 9, 2011

Related U.S. Application Data

(60) Provisional application No. 61/267,300, filed on Dec. 7, 2009.

(51) Int. Cl.
*H04L 27/26* (2006.01)
*H04L 1/06* (2006.01)

(52) U.S. Cl.
CPC ........ *H04L 27/2657* (2013.01); *H04L 27/2675* (2013.01); *H04L 1/0618* (2013.01)

(58) Field of Classification Search
CPC .................................................. H04L 27/2657
USPC ....................................................... 370/338
See application file for complete search history.

(56) References Cited

U.S. PATENT DOCUMENTS

| 8,027,373 | B2 | 9/2011 | Subrahmanya et al. | |
| 2002/0191535 | A1* | 12/2002 | Sugiyama et al. | 370/208 |
| 2003/0092456 | A1* | 5/2003 | Dent | 455/503 |
| 2005/0141407 | A1* | 6/2005 | Sandhu | 370/203 |
| 2006/0018394 | A1 | 1/2006 | van Zelst et al. | |
| 2006/0209973 | A1 | 9/2006 | Gorokhov et al. | 375/260 |
| 2007/0004337 | A1* | 1/2007 | Biswas et al. | 455/63.1 |
| 2007/0060095 | A1* | 3/2007 | Subrahmanya et al. | 455/343.1 |
| 2007/0087749 | A1* | 4/2007 | Ionescu et al. | 455/436 |
| 2007/0177688 | A1* | 8/2007 | Wu et al. | 375/267 |
| 2008/0159424 | A1 | 7/2008 | Hoo et al. | |

(Continued)

FOREIGN PATENT DOCUMENTS

| CN | 1380778 A | 11/2002 |
| JP | 2003060604 A | 2/2003 |

(Continued)

OTHER PUBLICATIONS

Ahmadi S, "An overview of next-generation mobile WiMAX technology", IEEE Communications Magazine, IEEE Service Center, Piscataway, US, vol. 47, No. 6, Jun. 1, 2009, pp. 84-98, XP011281828, ISSN: 0163-6804, DOI: DOI:10.1109/MCOM.2009. 5116805.

(Continued)

*Primary Examiner* — Luat Phung
*Assistant Examiner* — Saad A Waqas
(74) *Attorney, Agent, or Firm* — Eric Ho

(57) ABSTRACT

A communication device for enabling phase tracking is described. The communication device includes a processor and instructions stored in memory. The communication device generates a plurality of pilot symbols. The pilot symbols conform to a rank-deficient pilot mapping matrix. The communication device also transmits the plurality of pilot symbols.

65 Claims, 12 Drawing Sheets

(56) References Cited

U.S. PATENT DOCUMENTS

2009/0122882 A1* 5/2009 Mujtaba ................ 375/260
2010/0020955 A1* 1/2010 Wengrovitz ............ 379/202.01

FOREIGN PATENT DOCUMENTS

| JP | 2005260337 A | 9/2005 |
| JP | 2006135543 A | 5/2006 |
| JP | 2006522553 A | 9/2006 |
| JP | 2006295629 A | 10/2006 |
| JP | 2006324822 A | 11/2006 |
| JP | 2008530909 A | 8/2008 |
| JP | 2010283509 A | 12/2010 |
| KR | 20090020464 A | 2/2009 |
| WO | WO-2004088914 A1 | 10/2004 |
| WO | WO2005067247 A1 | 7/2005 |
| WO | WO-2006013858 A1 | 2/2006 |
| WO | 2006086493 A1 | 8/2006 |
| WO | 2007035737 | 3/2007 |

OTHER PUBLICATIONS

International Search Report and Written Opinion—PCT/US2010/059250, International Search Authority—European Patent Office—Mar. 16, 2011.
"IEEE Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Higher Throughput," IEEE Unapproved Draft Std P802.11n/D9.0, Mar. 2009.
Taiwan Search Report—TW099142663—TIPO—Dec. 22, 2013.
Kim Y., et al., Phase Tracking During VHT-LTF, IEEE 802. 11-10/0771r0 [online], Jul. 12, 2010, URL, https://mentor.ieee.org/802.11/documents?n=0771&is_group=00ac.
Zelst V., et al., "Pilot Sequence for VHT-DATA, IEEE 802.11-10/0811r1," Jul. 12, 2010.
European Search Report—EP15181151—Search Authority—Berlin—Nov. 23, 2015.

* cited by examiner

FIG. 8

Full Rank Pilot Mapping Matrix 1054

| | Set A 1058a | Set B 1058b | Set C 1058c | Set D 1058d |
|---|---|---|---|---|
| Sequence A 1056a | +1 | +1 | +1 | -1 |
| Sequence B 1056b | +1 | -1 | -1 | +1 |
| Sequence C 1056c | +1 | +1 | +1 | +1 |
| Sequence D 1056d | -1 | +1 | +1 | +1 |

FIG. 9

Rank-Deficient Pilot Mapping Matrix 1160

| | Set A 1164a | Set B 1164b | Set C 1164c | Set D 1164d |
|---|---|---|---|---|
| Sequence A 1162a | +1 | +1 | +1 | +1 |
| Sequence B 1162b | +1 | +1 | +1 | -1 |
| Sequence C 1162c | +1 | +1 | +1 | +1 |
| Sequence D 1162d | +1 | -1 | +1 | -1 |

Identical Pilot Symbols A 1166a
Identical Pilot Symbols B 1166b

| | Set A 1264a | Set B 1264b | Set C 1264c | Set D 1264d | Set E 1264e | Set F 1264f | Set G 1264g | Set H 1264h |
|---|---|---|---|---|---|---|---|---|
| Sequence A 1262a | +1 | +1 | +1 | +1 | +1 | +1 | +1 | +1 |
| Sequence B 1262b | +1 | −1 | +1 | −1 | +1 | −1 | +1 | −1 |
| Sequence C 1262c | +1 | +1 | −1 | −1 | +1 | +1 | −1 | −1 |
| Sequence D 1262d | +1 | −1 | −1 | +1 | +1 | −1 | −1 | +1 |
| Sequence E 1262e | +1 | +1 | +1 | +1 | −1 | −1 | −1 | −1 |
| Sequence F 1262f | +1 | −1 | +1 | −1 | −1 | +1 | −1 | +1 |
| Sequence G 1262g | +1 | +1 | −1 | −1 | −1 | −1 | +1 | +1 |
| Sequence H 1262h | +1 | −1 | −1 | +1 | −1 | +1 | +1 | −1 |

Rank-Deficient Pilot Mapping Matrix 1260

Identical Pilot Symbols A 1266a
Identical Pilot Symbols C 1266c
Identical Pilot Symbols B 1266b
Identical Pilot Symbols D 1266d

FIG. 10

| | Set A 1364a | Set B 1364b | Set C 1364c | Set D 1364d | Set E 1364e | Set F 1364f | Set G 1364g | Set H 1364h |
|---|---|---|---|---|---|---|---|---|
| Sequence A 1362a | +1 | +1 | +1 | +1 | +1 | +1 | +1 | +1 |
| Sequence B 1362b | +1 | +1 | −1 | −1 | +1 | +1 | −1 | −1 |
| Sequence C 1362c | +1 | +1 | −1 | +1 | −1 | +1 | −1 | −1 |
| Sequence D 1362d | +1 | +1 | +1 | −1 | −1 | −1 | +1 | +1 |
| Sequence E 1362e | +1 | +1 | +1 | +1 | +1 | +1 | +1 | +1 |
| Sequence F 1362f | +1 | +1 | −1 | −1 | +1 | +1 | −1 | −1 |
| Sequence G 1362g | +1 | +1 | −1 | +1 | −1 | +1 | −1 | −1 |
| Sequence H 1362h | +1 | +1 | +1 | −1 | −1 | −1 | +1 | +1 |

Rank-Deficient Pilot Mapping Matrix 1360

Identical Pilot Symbols A 1366a (Sets A, B)
Identical Pilot Symbols B 1366b (Sets C, D)
Identical Pilot Symbols C 1366c (Sets E, F)
Identical Pilot Symbols D 1366d (Sets G, H)

FIG. 11

ENABLING PHASE TRACKING FOR A COMMUNICATION DEVICE

RELATED APPLICATIONS

This application claims priority to U.S. Provisional Patent Application Ser. No. 61/267,300, entitled "11ac PILOT TONE DESIGN TO ALLOW RF CARRIER PHASE TRACKING.", filed Dec. 7, 2009, which is expressly incorporated by reference herein in its entirety.

TECHNICAL FIELD

The present disclosure relates generally to communication systems. More specifically, the present disclosure relates to enabling phase tracking for a communication device.

SUMMARY

A communication device for enabling phase tracking is disclosed. The communication device includes a processor and instructions stored in memory. The communication device generates a plurality of pilot symbols. The pilot symbols conform to a rank-deficient pilot mapping matrix. The communication device also transmits the plurality of pilot symbols. The pilot symbols may be Orthogonal Frequency-Division Multiplexing (OFDM) pilot symbols. The communication device may be a wireless communication device.

The communication device may also transmit data or training symbols. The data or training symbols may be Orthogonal Frequency-Division Multiplexing (OFDM) data or training symbols.

The rank-deficient pilot mapping matrix may include at least one pair of identical pilot symbols. The rank-deficient pilot mapping matrix may be a rank-deficient pilot mapping matrix R. Each row may correspond to pilot symbols transmitted on a different spatial stream and each column may correspond to pilot symbols transmitted on different Orthogonal Frequency-Division Multiplexing (OFDM) symbols.

The rank-deficient pilot mapping matrix for four spatial streams and four Orthogonal Frequency-Division Multiplexing (OFDM) symbols may be $$\begin{bmatrix} 1 & -1 & 1 & 1 \\ 1 & -1 & 1 & 1 \\ 1 & -1 & 1 & 1 \\ 1 & -1 & 1 & 1 \end{bmatrix}.$$

The rank-deficient pilot mapping matrix for six spatial streams and six Orthogonal Frequency-Division Multiplexing (OFDM) symbols may be $$\begin{bmatrix} 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \end{bmatrix}.$$

The rank-deficient pilot mapping matrix for eight spatial streams and eight Orthogonal Frequency-Division Multiplexing (OFDM) symbols may be $$\begin{bmatrix} 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \end{bmatrix}.$$

The plurality of pilot symbols may be transmitted during a training period. The training period may include Very High Throughput-Long Training Field (VHT-LTF) symbols transmitted according to Institute of Electrical and Electronics Engineers (IEEE) 802.11ac specifications. The pilot symbols may be transmitted on tones reserved for pilot tones in Very High Throughput-Long Training Fields (VHT-LTFs).

A communication device for tracking phase is also disclosed. The communication device includes a processor and instructions stored in memory. The communication device receives a plurality of pilot symbols from a sending communication device. The pilot symbols conform to a rank-deficient pilot mapping matrix. The communication device also determines a phase estimate based on the pilot symbols. The communication device further estimates a channel based on the phase estimate and the pilot symbols. The communication device additionally receives data from the sending communication device using the channel estimate. The communication device may be a base station. The pilot symbols may be Orthogonal Frequency-Division Multiplexing (OFDM) pilot symbols.

The rank-deficient pilot mapping matrix may include at least one pair of identical pilot symbols. The rank-deficient pilot mapping matrix may be a rank-deficient pilot mapping matrix R. Each row may correspond to pilot symbols transmitted on a different spatial stream and each column may correspond to pilot symbols transmitted on different Orthogonal Frequency-Division Multiplexing (OFDM) symbols.

The phase estimate may be determined based on identical pilot symbols transmitted on all spatial streams but across different Orthogonal Frequency-Division Multiplexing (OFDM) symbols. The phase estimate may be determined by computing a cross-correlation of identical pilot symbols transmitted on all spatial streams but across different Orthogonal Frequency-Division Multiplexing (OFDM) symbols.

The communication device may also determine the phase estimate based on the at least one pair of identical pilot symbols. The phase estimate may be determined by computing a cross-correlation of the identical pilot symbols. The phase estimate may be determined by computing a phase delta of the identical pilot symbols. The phase estimate may be determined by computing a phase delta of identical pilot symbols transmitted on all spatial streams but across different Orthogonal Frequency-Division Multiplexing (OFDM) symbols.

The plurality of pilot symbols may be received during a training period. The training period may include Very High Throughput-Long Training Field (VHT-LTF) symbols transmitted according to Institute of Electrical and Electronics Engineers (IEEE) 802.11ac specifications.

The phase estimate may be determined during a training period. The training period may include Very High Throughput-Long Training Field (VHT-LTF) symbols transmitted according to Institute of Electrical and Electronics Engineers (IEEE) 802.11ac specifications.

The channel may be estimated during a training period. The training period may include Very High Throughput-Long Training Field (VHT-LTF) symbols transmitted according to Institute of Electrical and Electronics Engineers (IEEE) 802.11ac specifications.

A method for enabling phase tracking is also disclosed. The method includes generating a plurality of pilot symbols on a communication device. The pilot symbols conform to a rank-deficient pilot mapping matrix. The method also includes transmitting the plurality of pilot symbols.

A method for tracking phase is also disclosed. The method includes receiving, by a communication device, a plurality of pilot symbols from a sending communication device. The pilot symbols conform to a rank-deficient pilot mapping matrix. The method also includes determining, by the communication device, a phase estimate based on the pilot symbols. The method further includes estimating a channel based on the phase estimate and the pilot symbols. The method additionally includes receiving data from the sending communication device using the channel estimate.

A computer-program product for enabling phase tracking is also disclosed. The computer-program product includes a non-transitory tangible computer-readable medium with instructions. The instructions include code for causing a communication device to generate a plurality of pilot symbols. The pilot symbols conform to a rank-deficient pilot mapping matrix. The instructions also include code for causing the communication device to transmit the plurality of pilot symbols.

A computer-program product for tracking phase is also disclosed. The computer-program product includes a non-transitory tangible computer-readable medium with instructions. The instructions include code for causing a communication device to receive a plurality of pilot symbols from a sending communication device. The pilot symbols conform to a rank-deficient pilot mapping matrix. The instructions also include code for causing the communication device to determine a phase estimate based on the pilot symbols. The instructions further include code for causing the communication device to estimate a channel based on the phase estimate and the pilot symbols. The instructions additionally include code for causing the communication device to receive data from the sending communication device using the channel estimate.

An apparatus for enabling phase tracking is also disclosed. The apparatus includes means for generating a plurality of pilot symbols. The pilot symbols conform to a rank-deficient pilot mapping matrix. The apparatus also includes means for transmitting the plurality of pilot symbols.

An apparatus for tracking phase is also disclosed. The apparatus includes means for receiving a plurality of pilot symbols from a sending communication device. The pilot symbols conform to a rank-deficient pilot mapping matrix. The apparatus also includes means for determining a phase estimate based on the pilot symbols. The apparatus further includes means for estimating a channel based on the phase estimate and the pilot symbols. The apparatus additionally includes means for receiving data from the sending communication device using the channel estimate.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

Use of communication devices has dramatically increased over the past few years. Communication devices often provide access to a network, such as a Local Area Network (LAN) or the Internet, for example. Other communication devices (e.g., access terminals, laptop computers, smart phones, media players, gaming devices, etc.) may simultaneously communicate with these communication devices. Some communication devices comply with certain industry standards, such as the Institute of Electrical and Electronics Engineers (IEEE) 802.11a, 802.11b, 802.11g or 802.11n (e.g., Wireless Fidelity or "Wi-Fi") standards. Users of wireless communication devices, for example, often connect to wireless networks using such communication devices.

When communication devices use multiple antennas, particular difficulties may arise. For example, phase offsets (e.g., errors) and/or frequency offsets (e.g., errors) can occur, which may lead to degraded communication performance. For this reason, improved systems and methods that help track phase may be beneficial.

BRIEF DESCRIPTION OF THE DRAWINGS

FIG. 8 is a diagram illustrating one example of a full rank pilot mapping matrix;

FIG. 9 is a diagram illustrating one example of a rank-deficient pilot mapping matrix that may be used according to the systems and methods disclosed herein;

FIG. 10 is a diagram illustrating another example of a rank-deficient pilot mapping matrix that may be used according to the systems and methods disclosed herein;

FIG. 11 is a diagram illustrating another example of a rank-deficient pilot mapping matrix that may be used according to the systems and methods disclosed herein;

DETAILED DESCRIPTION

Figure 1:
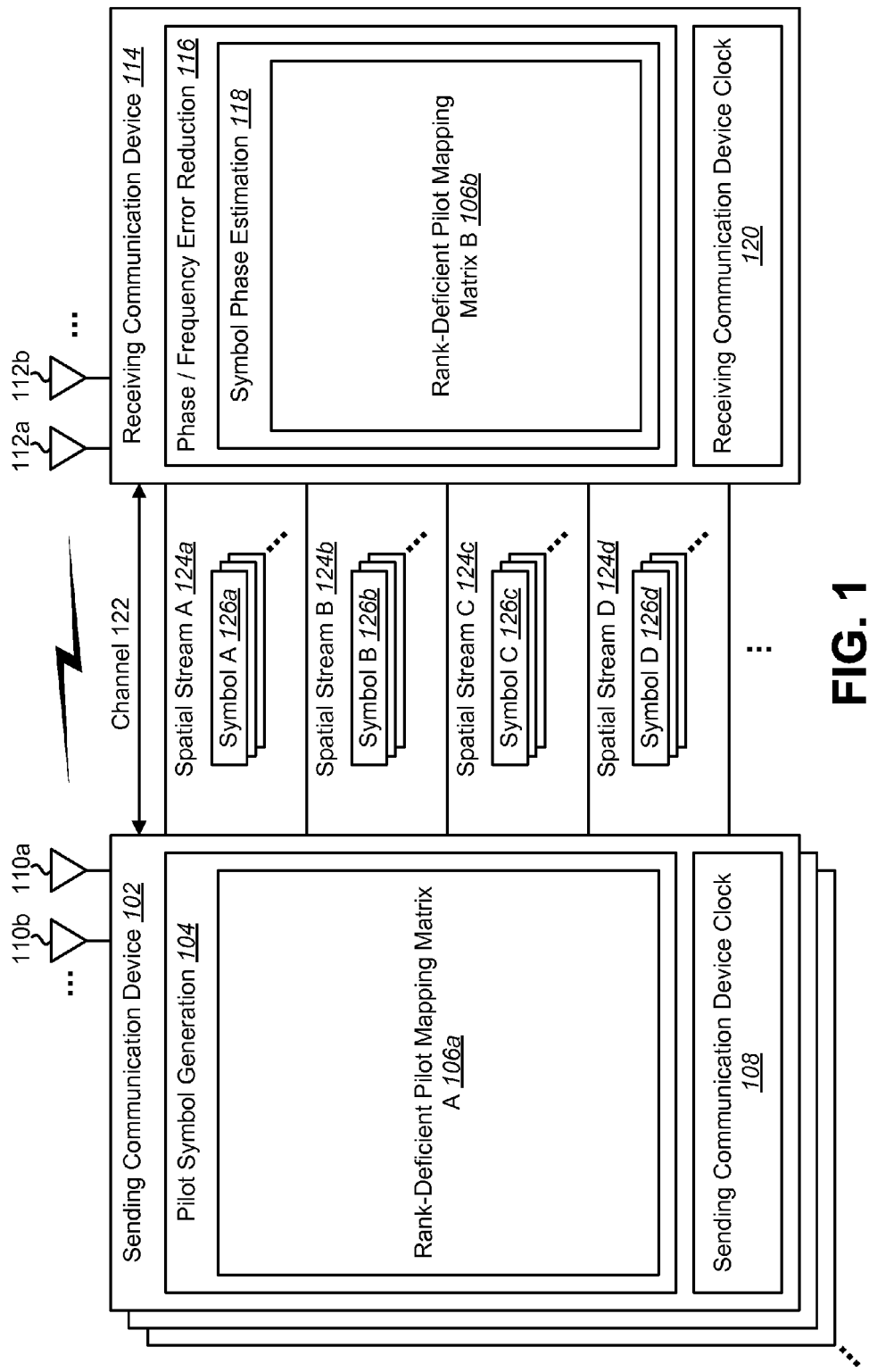
FIG. 1 is a block diagram illustrating one configuration of communication devices in which systems and methods for enabling phase tracking for a communication device may be implemented.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as the Institute of Electrical and Electronics Engineers (IEEE) 802.11a, 802.11b, 802.11g, 802.11n and/or 802.11ac (e.g., Wireless Fidelity or "Wi-Fi") standards. Other examples of standards that a base station may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a kind of communication device (e.g., access terminal, client device, client station, etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

In IEEE 802.11, a communication device may send pilot symbols to another communication device. The pilot symbols may be sent using multiple spatial streams, for example. It should be noted that the term "pilot symbol" may refer to a "training symbol" and vice-versa. The pilot symbols may be arranged in a space-time structure that can be represented as a Space Time Code (STC) matrix (e.g., pilot mapping matrix). For example, for a number of space-time streams (e.g., spatial streams) $N_{STS}=4$ and for a 20 megahertz (MHz) transmission, the pilot mapping matrix R of pilot values or symbols is illustrated in Equation (1).

$$R = \begin{bmatrix} 1 & 1 & 1 & -1 \\ 1 & 1 & -1 & 1 \\ 1 & -1 & 1 & 1 \\ -1 & 1 & 1 & 1 \end{bmatrix} \quad (1)$$

Additional examples of pilot values or symbols Ψ for different numbers of space-time streams (e.g., spatial streams) $N_{STS}$ according to a space-time stream $i_{STS}$ (e.g., number or index) that may be used in accordance with IEEE 802.11 standards are illustrated in Table 1.

TABLE 1

| $N_{STS}$ | $i_{STS}$ | $\Psi_{i_{STS},0}^{(N_{STS})}$ | $\Psi_{i_{STS},1}^{(N_{STS})}$ | $\Psi_{i_{STS},2}^{(N_{STS})}$ | $\Psi_{i_{STS},3}^{(N_{STS})}$ |
|---|---|---|---|---|---|
| 1 | 1 | 1 | 1 | 1 | -1 |
| 2 | 1 | 1 | 1 | -1 | -1 |
| 2 | 2 | 1 | -1 | -1 | 1 |
| 3 | 1 | 1 | 1 | -1 | -1 |
| 3 | 2 | 1 | -1 | 1 | -1 |
| 3 | 3 | -1 | 1 | 1 | -1 |
| 4 | 1 | 1 | 1 | 1 | -1 |
| 4 | 2 | 1 | 1 | -1 | 1 |
| 4 | 3 | 1 | -1 | 1 | 1 |
| 4 | 4 | -1 | 1 | 1 | 1 |

In one configuration, the pilot mapping matrix (e.g., matrix R) may be defined, where rows represent spatial streams and the columns represent symbols (e.g., Orthogonal Frequency-Division Multiplexing (OFDM) symbols). In the pilot mapping matrix illustrated by Equation (1), for example, the first spatial stream uses a pilot value or symbol of "1" for three consecutive OFDM symbols, followed by a pilot value or symbol of "−1" in the fourth OFDM symbol. This procedure may then repeat. The pilot mapping matrix illustrated in Equation (1) is full rank.

The rank of a matrix (e.g., pilot mapping matrix) may be defined as the number of non-zero singular values (e.g., eigenvalues) of the matrix. In other words, the rank of the pilot mapping matrix may be the number of linearly independent rows or columns in the pilot mapping matrix. A matrix may be "full rank" if its rank is as large as possible. In other words, a matrix may be "full rank" if its rank equals its smallest dimension (in number of rows or columns, for example). For example, the matrix illustrated in Equation (1) is full rank because its rank of 4 is the largest rank it could possibly have. That is, it has a rank of 4 and its smallest dimension (of 4 rows and 4 columns, for example) is 4. A matrix may be "rank-deficient" if its rank is less than "full rank." For example, if a matrix has a rank that is smaller than the maximum possible rank for a matrix of that size, the matrix is "rank-deficient." In other words, if the number of non-zero singular values or the number or linearly independent rows or columns is less than the maximum possible number for a matrix of that size, the matrix is "rank-deficient."

Because the example of a pilot mapping matrix in Equation (1) is full rank, a receiving communication device (e.g., receiver) may utilize these pilot tones and capture a full 4th-order of diversity by combining information over four consecutive symbols (e.g., OFDM symbols). However, because the pilot mapping matrix illustrated in Equation (1) is full rank, there is no information that can be used to track phase errors in a Radio Frequency (RF) carrier during a period or sequence of four pilot symbols (e.g., OFDM symbols). This may cause an issue, for example, during a training period (e.g., a part of a preamble where there are Long Training Fields (LTFs)). In one configuration, the training period may comprise Very High Throughput-Long Training Field (VHT-LTF) symbols transmitted according to Institute of Electrical and Electronics Engineers (IEEE) 802.11ac specifications. During this training period (e.g., part of the preamble), the channel estimate may be computed and may be sensitive to unknown, uncorrected phase drifts.

The systems and methods disclosed herein may allow pilot symbols to be modulated and/or sent (over time, for example) with some diversity, but may also provide a structure such that the RF carrier phase can be tracked during the symbols occupied by LTFs (e.g., during the training period). The systems and methods disclosed herein describe a pilot mapping matrix that comprises a null space. The null space may allow a receiving communication device (e.g., receiver) to use information during the training period (e.g., during the LTFs) to track RF carrier deviations. The systems and methods disclosed herein may be applied to IEEE 802.11ac, for example.

In one configuration, for example, a transmission using four spatial streams may use a pilot mapping matrix R as illustrated in Equation (2).

$$R = \begin{bmatrix} 1 & 1 & 1 & 1 \\ 1 & -1 & 1 & -1 \\ 1 & 1 & 1 & 1 \\ 1 & -1 & 1 & -1 \end{bmatrix} \quad (2)$$

The pilot mapping matrix illustrated in Equation (2) has rank 2. In this configuration, a receiving communication device (e.g., receiver) may only be able to capture $2^{nd}$ order diversity. However, the pilot tones are now structured such that the RF carrier phase can be tracked. Since the pilot tones repeat every two symbols (e.g., OFDM symbols), the RF carrier phase can be computed by taking a correlation (e.g., a cross-correlation) or phase differential of the $1^{st}$ and $3^{rd}$ symbols (e.g., OFDM symbols) or pilot tones and taking a correlation (e.g., a cross-correlation) or phase differential of the $2^{nd}$ and $4^{th}$ symbols (e.g., OFDM symbols) or pilot tones. This approach or design of pilot tones may be generally applied, in that any matrix with less than full rank may be used to trade off diversity gain at the receiver with available structure to compute the RF carrier phase drift.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of communication devices 102, 114 in which systems and methods for enabling phase tracking for a communication device may be implemented. Examples of communication devices 102, 114 include a wireless communication device, base station, User Equipment (UE), station (STA), access terminal, access point, wireless router, desktop computer, laptop computer, smartphone, cellular phone, Personal Digital Assistant (PDA), tablet device, e-reader, gaming system, etc. One or more "sending" communication devices 102 may include one or more antennas 110a-b used to communicate with a "receiving" communication device 114. The receiving communication device 114 may include one or more antennas 112a-b that it 114 may use to communicate with the sending communication device 102 across a channel 122. It should be noted that the communication devices 102, 114 are termed a "sending" communication device 102 and a "receiving" communication device 114 for convenience and ease of explanation and should not be limited to "sending" and/or "receiving" functions. For example, the "sending" communication device 102 may additionally or alternatively receive signals sent by the "receiving" communication device 114 and vice versa.

The one or more sending communication devices 102 may communicate with the receiving communication device 114 using one or more spatial streams 124. For example, the spatial streams 124a-d may be used to convey information or data between the one or more sending communication devices 102 and the receiving communication device 114. For instance, the one or more sending communication devices 102 and/or the receiving communication device 114 may send and/or receive one or more symbols 126 using the one or more spatial streams 124. More specifically, the one or more sending communication devices 102 and the receiving communication device 114 may send and/or receive one or more symbols A 126a using spatial stream A 124a, one or more symbols B 126b using spatial stream B 124b, one or more symbols C 126c using spatial stream C 124c and/or one or more symbols D 126d using spatial stream D 124d, etc. Each spatial stream 124 may correspond to one or more antennas 110, 112. For example, spatial stream A 124a may be transmitted from an antenna 110a on the sending communication device 102 and received by an antenna 112a on the receiving communication device 114. In one configuration, one or more spatial streams 124 may be sent and/or received using multiple antennas 110, 112 (e.g., one spatial stream 124 may be mapped to two or more antennas 110, 112).

The one or more sending communication devices 102 may (each) include a sending communication device clock 108. The receiving communication device 114 may include a receiving communication device clock 120. The sending communication device clock 108 may be used by the one or more sending communication devices 102 to time the generation, transmission of and/or reception of symbols 126. Similarly, the receiving communication device clock 120 may be used by the receiving communication device 114 to time the generation, transmission of and/or reception of symbols 126. The sending communication device clock 108 and the receiving communication device clock 120 may not be precisely synchronized. The lack of precise synchronization between the clocks 108, 120 may cause phase offsets (e.g., phase noise) and/or frequency offsets (e.g., frequency errors). The phase offsets and/or frequency offsets may cause degraded communication quality between the one or more sending communication devices 102 and the receiving communication device 114.

The symbols 126 may comprise pilot symbols, data symbols and/or other kinds of symbols. For example, pilot symbols may comprise symbols that are known to the receiving communication device 114 such that the receiving communication device 114 may use the pilot symbols to estimate one or more phase offsets. In some configurations, one or more pilots (e.g., a pilot pattern) may be sent with a data symbol. The receiving communication device 114 may use the one or more phase offsets to compute a channel estimate that may be used to demodulate and/or decode signals sent from the sending communication device 102. For example, the receiving communication device 114 may include a phase and/or frequency error reduction module 116. The phase and/or frequency error reduction module 116 may include a symbol phase estimation module 118. The symbol phase estimation module 118 may use rank-deficient pilot mapping matrix B 106b to track symbol phase during a training period. The phase and/or frequency error reduction module 116 may use the tracked phase to compute a channel estimate with reduced phase and/or frequency errors that may be used to demodulate and/or decode received symbols 126. The phase and/or frequency error reduction module 116 and/or the symbol phase estimation module 118 may be implemented in software, hardware or a combination of both.

The one or more sending communication devices 102 may include a pilot symbol generation 104 module. The pilot symbol generation module 104 may be implemented in software, hardware or a combination of both. The pilot symbol generation module 104 generates pilot symbols to be sent to the receiving communication device 114. For example, each pilot symbol may be transmitted or sent on one or more spatial streams 124 to the receiving communication device 114. In one configuration, for instance, the pilot symbol generation module 104 may generate one or more sequences of pilot symbols, with each sequence of pilot symbols being sent or transmitted on a different spatial stream 124.

The pilot symbol generation module 104 may generate pilot symbols that conform to a rank-deficient pilot mapping matrix 106. For example, the pilot symbol generation module 104 generates rank-deficient pilot mapping matrix A 106a. The rank-deficient pilot mapping matrix A 106a may have a rank that is less than the number of spatial streams 124. For instance, assuming that there are four spatial streams 124a-d, rank-deficient pilot mapping matrix A 106a may be generated such that it is rank 2 or has rank 2. The one or more sending communication devices 102 may send or transmit rank-deficient pilot mapping matrix A 106a to the receiving communication device 114. The receiving communication device 114 may receive rank-deficient pilot mapping matrix A 106a as rank-deficient pilot mapping matrix B 106b.

When the systems and methods disclosed herein are not used, a full rank pilot mapping matrix would allow the receiving communication device 114 to estimate a phase offset for each spatial stream 124. However, the full rank pilot mapping matrix may not allow the receiving communication device 114 to estimate the phase offset during a training period (e.g., during a sequence of pilot symbols or pilot mapping matrix). For example, a pilot mapping matrix may comprise a sequence of pilot symbols over a training period for a number of spatial streams 124. In one example, the training period comprises a sequence of four pilot symbols. Assuming that there are four spatial streams 124, a sequence of four pilot symbols would be sent for each of the four spatial streams, resulting in a 4×4 pilot mapping matrix having a total of 16 pilot symbols, where each row corresponds to a spatial stream 124 and each column corresponds to a pilot symbol or value. Because a full-rank pilot mapping matrix includes pilot sequences that are linearly independent, the pilot symbol phase offset cannot be tracked during the training period. For instance, the pilot symbol phase offset may only be computed once for each pilot mapping matrix when the systems and methods disclosed herein are not used.

The rank-deficient pilot mapping matrix 106 allows phase drift to be tracked during the training period. Because the rank-deficient pilot mapping matrix 106 includes a null space, a phase offset may be tracked during the training period. However, since the rank-deficient pilot mapping matrix 106 is rank-deficient, a separate phase offset for each of (all of) the spatial streams 124 cannot be computed. In other words, using a rank-deficient pilot mapping matrix trades the ability to estimate phase offsets for all of the spatial streams 124 for the ability to estimate phase offsets during the training period, thus allowing phase tracking during the training period. For instance, the rank-deficient pilot mapping matrix 106 allows sets (e.g., identical sets) of pilot symbols to be repeated during the training period. The symbol phase estimation module 118 may compute a cross-correlation or phase delta of the original (or first) set of pilot symbols and the repeated set of pilot symbols during the training period, thus allowing tracking of RF carrier phase during the training period. The tracked phase of the RF carrier may be used by the phase and/or frequency error reduction module 116 to reduce phase and/or frequency errors. For example, the tracked RF carrier phase may be used to compute a channel estimate with reduced phase and/or frequency errors. The receiving communication device 114 may use this channel estimate (with reduced phase and/or frequency errors) to demodulate and/or decode received symbols 126.

In one configuration, phase and frequency offsets may be illustrated as follows. Suppose that a signal x(t) is transmitted, where "t" is time. Since the local oscillators (LOs) (e.g., sending communication device clock 108 and receiving communication device clock 120) at the transmitter (e.g., sending communication device 102) and at the receiver (e.g., receiving communication device 114) may be different, the received signal may be written as y(t)=x(t)*exp(j*θ(t))*exp(j*2π*$\Delta_f$*t), where $\Delta_f$ is the frequency offset and θ(t) is a time-varying phase offset.

Figure 2:
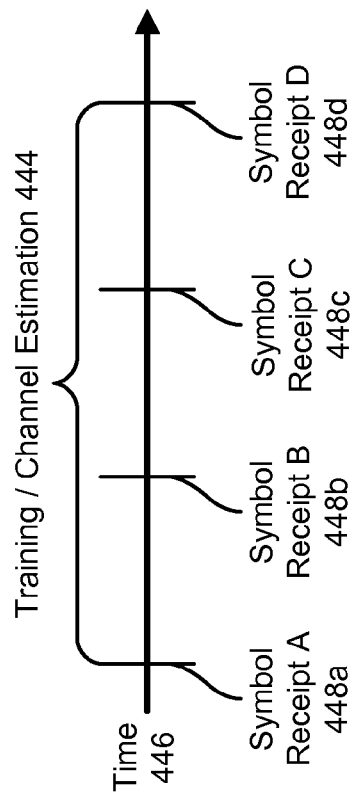
FIG. 2 is a diagram illustrating an example of a training period and/or channel estimation period.

FIG. 2 is a diagram illustrating an example of a training period and/or channel estimation period 444. A training period 444 may be a range of time 446 in which several training symbols are received. In one configuration, the training period 444 may comprise Very High Throughput-Long Training Field (VHT-LTF) symbols transmitted according to Institute of Electrical and Electronics Engineers (IEEE) 802.11ac specifications. A channel estimate may be generated during the training and/or channel estimation 444 period. The symbols received during the training period 444 may be long training symbols or comprise Long Training Fields (LTFs), for example. A set of symbols for multiple spatial streams may be received by a receiving communication device 114 at each symbol receipt 448. For example, a set of four pilot symbols corresponding to four spatial streams may be received at symbol receipt A 448a, symbol receipt B 448b, symbol receipt C 448c and symbol receipt D 448d. Thus, a total of 16 pilot symbols comprising a pilot mapping matrix may be received during the training period 444.

When the systems and methods disclosed herein are not used, the pilot mapping matrix may be full rank. In other words, each sequence of pilot symbols has a singular value (e.g., eigenvalue) greater than zero or each sequence of pilot symbols is linearly independent. In that case, the receiving communication device 114 is able to estimate a separate phase offset for each spatial stream. However, in that case, the receiving communication device 114 may not be able to track phase offsets (e.g., phase drift) during the training and/or channel estimation period 444. For example, the receiving communication device 114 would have to use phase estimates obtained before the training and/or channel estimation period 444 to determine a phase estimate for use in determining the channel estimate. Thus, in that case, the receiving communication device 114 is unable to determine a phase estimate based on the pilot symbols received during the current training period 444.

According to the systems and methods disclosed herein, however, the receiving communication device 114 may be able to determine a phase estimate during the training and/or channel estimation period 444 for use in determining a channel estimate. For example, the pilot mapping matrix 106 comprised of the sets of pilot symbols received at symbol receipt A 448a, B 448b, C 448c and D 448d may be a rank-deficient pilot mapping matrix 106. Thus, the number of pilot sequences that have a non-zero singular value (e.g., eigenvalue) or that are linearly independent is fewer than the number of spatial streams. The rank-deficient pilot mapping matrix 106, for example, may include one or more repeated sets of the same (e.g., identical) pilot symbols. The original set and repeated set of pilot symbols may be correlated in order to obtain a phase estimate. For example, a phase delta between the original and repeated set of pilot symbols may be computed. The phase estimate may indicate a phase drift between the original and repeated set of pilot symbols. Thus, the receiving communication device 114 may determine a phase estimate during the training period 444. This phase estimate may be used to determine a channel estimate. Using this approach, the phase estimate may be determined during the training period 444, which may reduce phase and/or frequency offsets. Thus, the receiving communication device 114 may use a channel estimate with reduced phase and/or frequency offsets to demodulate and/or decode received symbols (e.g., data symbols). This approach may improve communication performance. It should be noted, however, that in using a rank-deficient pilot mapping matrix 106, the receiving communication device 114 may not be able to determine an individual phase offset for each spatial stream 124.

Figure 3:
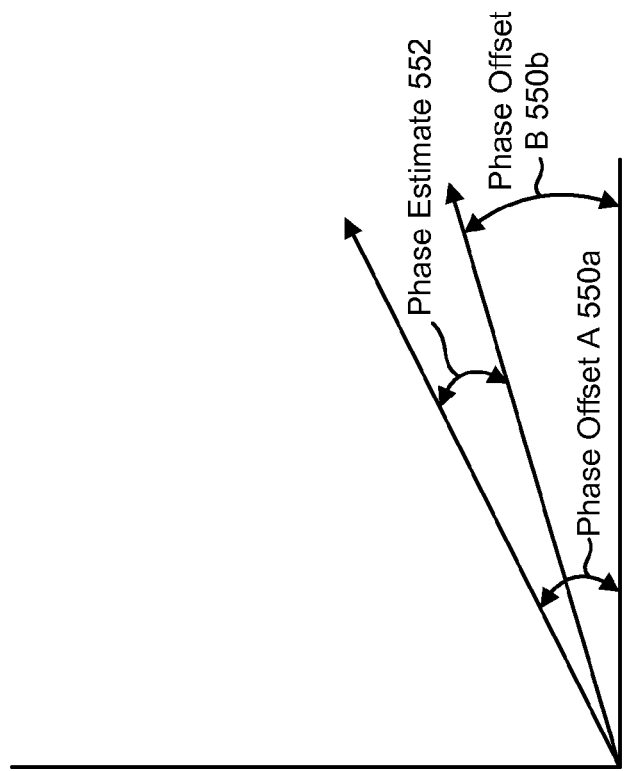
FIG. 3 is a diagram illustrating a phase estimate.

FIG. 3 is a diagram illustrating a phase estimate 552. Using the systems and methods disclosed herein, a receiving communication device 114 may use a rank-deficient pilot mapping matrix 106 to determine a phase estimate 552 during a training period 444. More specifically, the rank-deficient pilot mapping matrix 106 may allow one or more repeated sets of pilot symbols to be sent and/or received during the training period 444. For instance, a phase estimate between two channel estimation symbols is the same as the phase drift between those two symbols.

For example, a set of pilot symbols with particular pilot values may be received at symbol receipt A 448a and then a repeated set of pilot symbols with the same pilot values may be received at symbol receipt C 448c. Because the original set of pilot symbols at symbol receipt A 448a and the repeated set of pilot symbols at symbol receipt C 448c have the same pilot values, the receiving communication device 114 may determine a correlation or a phase delta between them in order to obtain a phase estimate 552. For instance, phase offset A 550a may be determined corresponding to the original set of pilot symbols received at symbol receipt A 448a. Phase offset B 550b corresponding to the repeated set of pilot symbols received at symbol receipt C 448c may also be determined. The receiving communication device 114 may then determine a correlation or phase delta between the original and repeated pilot symbols in order to obtain the phase estimate 552.

Additional or alternative pairs or multiples of repeated symbol sets may be used to determine phase estimates 552. For example, the set of pilot symbols sent and/or received at symbol receipt B 448b may be repeated at symbol receipt D 448d. A similar procedure to the one described above may be used to determine a phase estimate 552. In another configuration, a different order of repeated pilot symbol sets may be used. For example, the pilot symbols received at symbol receipt A 448a and those received at symbol receipt B 448b may be the same (e.g., identical) and thus may be used to obtain a phase estimate. Additionally or alternatively, the pilot symbols received at symbol receipt C 448c and D 448d may be the same. In other configurations, other pairs or multiples of repeated symbol sets may be used. For example, symbol sets received at symbol receipt A 448a and D 448a may be the same, while those received at B 448b and C 448c may be the same. Other configurations may be utilized, depending on the number of pilot symbols in a sequence and/or the number of spatial streams. It should be noted that the terms "same" and/or "identical" when used to describe pilot symbols or pilot symbol sets mean that the pilot values or symbols, but not necessarily the phases of the pilot symbols, are the same or identical.

Figure 4:
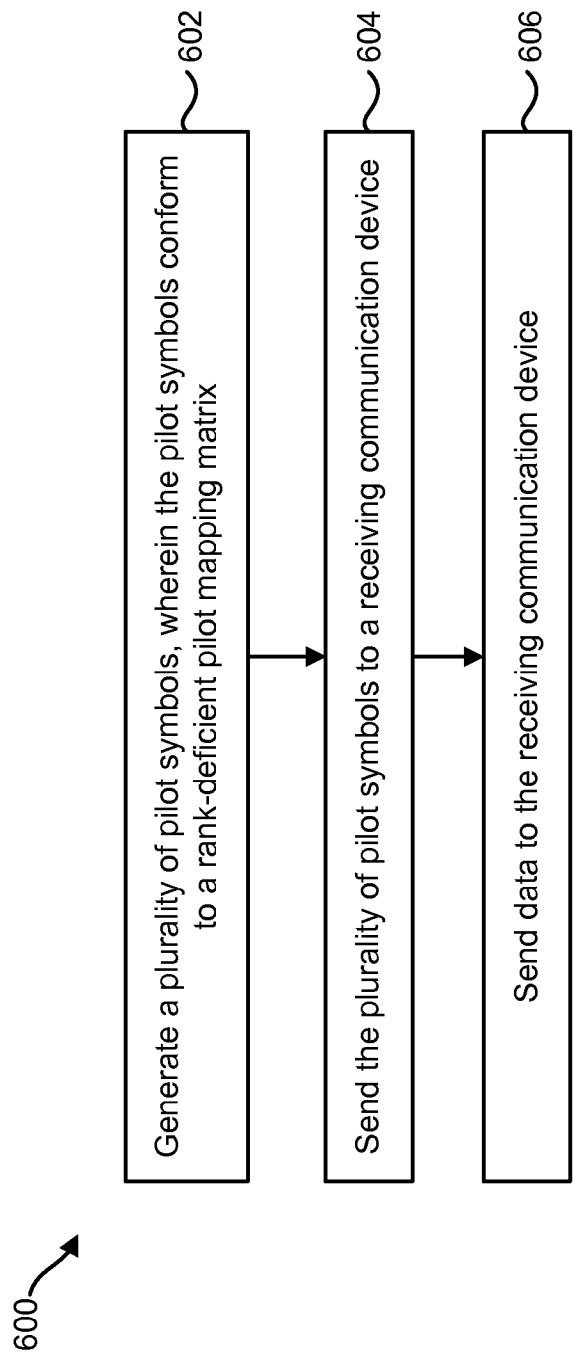
FIG. 4 is a flow diagram illustrating one configuration of a method for enabling phase tracking for a communication device.

FIG. 4 is a flow diagram illustrating one configuration of a method 600 for enabling phase tracking for a communication device. A sending communication device 102 may generate 602 a plurality of pilot symbols. The pilot symbols may conform to a rank-deficient pilot mapping matrix 106. For example, the sending communication device 102 may generate a sequence of pilot symbols for each spatial stream 124. The sequences of pilot symbols for each spatial stream may comprise the pilot mapping matrix 106. The pilot mapping matrix 106 may be rank-deficient. For example, the number of pilot symbol sequences generated 602 that have non-zero singular values (e.g., eigenvalues) or the number of pilot symbol sequences generated 602 that are linearly independent are fewer than the number of spatial streams 124.

In one configuration, the rank-deficient pilot mapping matrix may be a matrix R, where each row corresponds to pilot symbols transmitted on a different spatial stream and each column corresponds to pilot symbols transmitted on different Orthogonal Frequency-Division Multiplexing (OFDM) symbols. In one example, a rank-deficient pilot mapping matrix for four spatial streams and four OFDM symbols is $$\begin{bmatrix} 1 & -1 & 1 & 1 \\ 1 & -1 & 1 & 1 \\ 1 & -1 & 1 & 1 \\ 1 & -1 & 1 & 1 \end{bmatrix}.$$

In another example, a rank-deficient pilot mapping matrix for six spatial streams and six OFDM symbols is $$\begin{bmatrix} 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \end{bmatrix}.$$

In yet another example, a rank-deficient pilot mapping matrix for eight spatial streams and eight OFDM symbols is $$\begin{bmatrix} 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \end{bmatrix}.$$

The sending communication device 102 may send or transmit 604 the plurality of pilot symbols (e.g., "training symbols") to a receiving communication device 114. For example, the sending communication device 102 may transmit the pilot symbols in a sequence and on corresponding spatial streams. For instance, a first sequence of pilot symbols may be transmitted using one or more antennas 110a-b on a first spatial stream. A second sequence of pilot symbols may also be transmitted using one or more antennas 110a-b on a second spatial stream and so on. In one configuration, the pilot symbols (or "training symbols") may be Orthogonal Frequency-Division Multiplexing (OFDM) pilot symbols. Additionally or alternatively, in one configuration, the pilot symbols may be transmitted on tones reserved for pilot tones in Very High Throughput-Long Training Fields (VHT-LTFs) (according to Institute of Electrical and Electronics Engineers (IEEE) 802.11ac specifications, for example). As discussed above, the receiving communication device 114 may estimate a channel with reduced phase and/or frequency offsets based on the pilot symbols conforming to a rank-deficient mapping matrix. This procedure may occur during a training period, for example.

The sending communication device 102 may send or transmit 606 data (e.g., data symbols) to the receiving communication device 114. For example, the sending communication device 102 may transmit data (e.g., data symbols) to the receiving communication device 114. The receiving communication device 114 may use the channel estimate based on the pilot symbols to demodulate and/or decode the sent 606 data (e.g., data symbols). The data symbols may be Orthogonal Frequency-Division Multiplexing (OFDM) data symbols.

Figure 5:
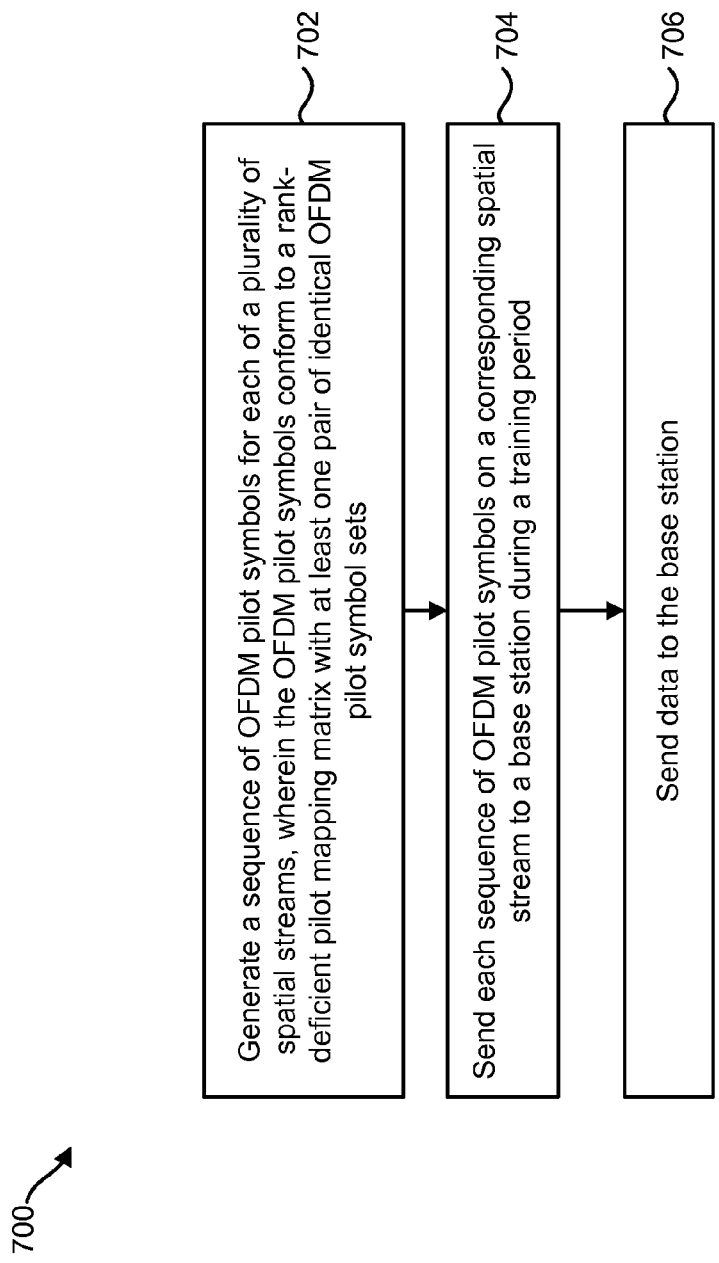
FIG. 5 is a flow diagram illustrating a more specific configuration of a method for enabling phase tracking for a communication device.

FIG. 5 is a flow diagram illustrating a more specific configuration of a method 700 for enabling phase tracking for a communication device. For example, FIG. 5 illustrates a method 700 similar to the method 600 illustrated in FIG. 4, but with more detail. A sending communication device 102 or wireless communication device 102 may generate 702 a sequence of OFDM pilot symbols for each of a plurality of spatial streams. Examples of wireless communication devices include stations (STA), access terminals, cellular phones, smartphones, laptop computers, wireless modems, e-readers, Personal Digital Assistants (PDAs), gaming systems, etc. The OFDM pilot symbols may comprise and/or conform to a rank-deficient pilot mapping matrix 106. For example, the number of OFDM pilot symbol sequences generated 702 that have non-zero singular values (e.g., eigenvalues) or the number of OFDM pilot symbol sequences generated 702 that are linearly independent are fewer than the number of spatial streams 124. A sequence of pilot symbols (e.g., OFDM pilot symbols) may correspond to a row in the rank-deficient pilot mapping matrix 106.

A set of pilot symbols may correspond to a column of the rank-deficient pilot mapping matrix 106. For example, a set of pilot symbols may comprise pilot symbols on different spatial streams that may be sent concurrently. As used herein, "concurrently" may mean at the same time and/or around the same time, but may not necessarily mean at exactly the same time. For instance, pilot symbols in a set of pilot symbols may be sent on different spatial streams at around the same time.

The rank-deficient pilot mapping matrix 106 may include at least one pair (or multiple) of identical OFDM pilot symbol sets. For example, an original set of OFDM pilot symbols (corresponding to a column in the rank-deficient pilot mapping matrix 106, for example) or values may be sent. Then a repeated set of OFDM pilot symbols or values may be sent later. The at least one pair of "identical" OFDM pilot symbol sets may have the same OFDM pilot symbol values. Additional pairs or multiples of identical OFDM pilot symbol sets may comprise the rank-deficient pilot mapping matrix.

The one or more pairs or multiples of identical OFDM pilot symbol sets may be arranged in a variety of ways. For example, assume that there are 8 columns of pilot symbol sets in the rank-deficient pilot mapping matrix 106 with 4 unique sets: set A, set B, set C and set D. In one arrangement, the pairs are arranged such that the columns are in a sequence: A B C D A B C D. In another arrangement, the identical pairs neighbor each other in a sequence: A A B B C C D D. Many other arrangements may be made, such as the sequence: A B A B C D C D, etc.

The wireless communication device 102 may send or transmit 704 each sequence of OFDM pilot symbols on a corresponding spatial stream to a base station 114 during a training period. A base station 114 may be one example of a receiving communication device 114. Examples of base stations 114 include access points, wireless routers, cellular phone base stations, etc. Each sequence of generated 702 OFDM pilot symbols in the rank-deficient pilot mapping matrix 106 may correspond to a spatial stream. Each sequence of OFDM pilot symbols may be sent 704 to the base station on its corresponding spatial stream. For example, each sequence of OFDM pilot symbols may be sent using one or more antennas 110$a$-$b$. The sequence of pilot symbols (e.g., OFDM pilot symbols) may be sent 704 (e.g., transmitted) during a training period 444, during which a channel estimate may be determined by the receiving communication device 114. More specifically, the receiving communication device 114 may use the OFDM pilot symbols to determine one or more phase estimates. The one or more phase estimates may be used to determine a channel estimate with reduced phase and/or frequency offsets.

The wireless communication device 102 may send or transmit 706 data (e.g., data symbols) to the base station (e.g., receiving communication device 114). For example, the wireless communication device 102 may transmit data symbols to the base station using one or more antennas 110$a$-$b$. The base station (e.g., receiving communication device) 114 may use the channel estimate based on the OFDM pilot symbols to demodulate and/or decode the sent 706 data (e.g., data symbols).

Figure 6:
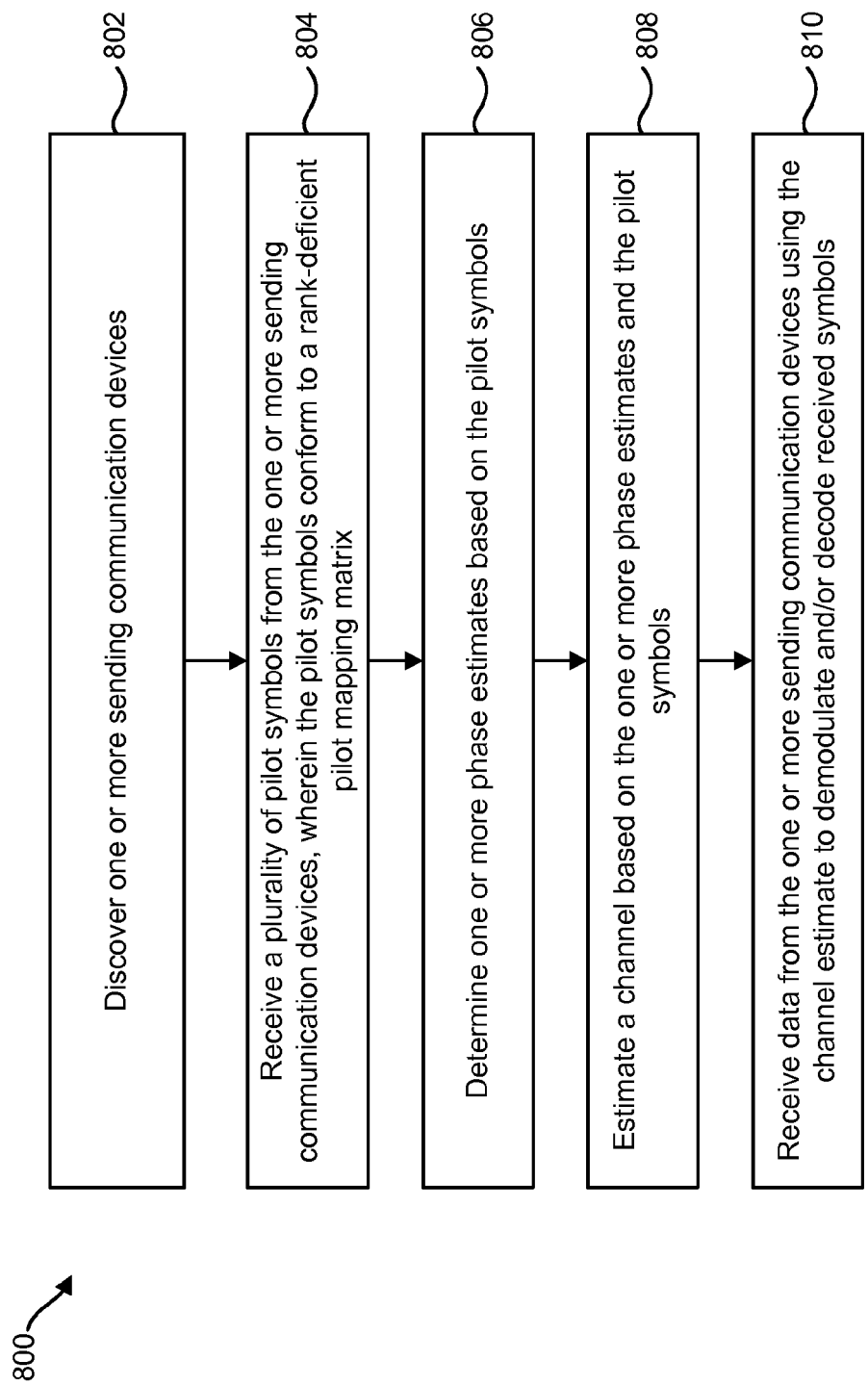
FIG. 6 is a flow diagram illustrating one configuration of a method for tracking carrier phase.

FIG. 6 is a flow diagram illustrating one configuration of a method 800 for tracking carrier phase. A receiving communication device 114 may discover 802 one or more sending communication devices 102. For example, the receiving communication device 114 may receive a message or symbol from a sending communication device 102 indicating an attempt to communicate with the receiving communication device 114. The receiving communication device 114 may receive 804 a plurality of pilot symbols from the one or more sending communication devices 102. The pilot symbols may conform to a rank-deficient pilot mapping matrix 106. For example, pilot symbols may be received 804 using a plurality of spatial streams 124. Each row of the rank-deficient pilot mapping matrix 106 may correspond to one of the spatial streams 124 (e.g., a sequence of pilot symbols received on one of the spatial streams 124). Each column of the rank-deficient pilot mapping matrix 106 may correspond to a pilot symbol or a set of pilot symbols (or values). The number of rows (e.g., sequences of pilot symbols) that have non-zero singular values (e.g., eigenvalues) or that are linearly independent may be fewer than the number of spatial streams or columns, indicating a pilot mapping matrix that is rank-deficient or less than full rank.

The receiving communication device 114 may determine 806 one or more phase estimates based on the pilot symbols. For example, the rank-deficient pilot mapping matrix 106 may include repeated pilot symbols. In a 4×4 rank-deficient pilot mapping matrix 106, for example, the $1^{st}$ and $3^{rd}$ pilot symbols (e.g., $1^{st}$ and $3^{rd}$ sets or columns) may be the same. Additionally or alternatively, the $2^{nd}$ and $4^{th}$ pilot symbols (e.g., $2^{nd}$ and $4^{th}$ sets or columns) may be the same. The receiving communication device 114 may determine a correlation (e.g., cross-correlation) or phase differential of the original and repeated pilot symbols to determine 806 the phase estimate. Continuing the 4×4 rank-deficient pilot mapping matrix 106 example, the receiving communication device 114 may determine a correlation (e.g., cross-correlation) or phase differential between the $1^{st}$ and $3^{rd}$ pilot symbols (e.g., $1^{st}$ and $3^{rd}$ sets or columns) and between the $2^{nd}$ and 4$^{th}$ pilot symbols (e.g., 2$^{nd}$ and 4$^{th}$ sets or columns) to determine 806 one or more phase estimates. In another example, the phase estimate may be determined 806 based on identical pilot symbols that are transmitted on all of the spatial streams but across different Orthogonal Frequency-Division Multiplexing (OFDM) symbols. Determining 806 one or more phase estimates 806 during the training period 444 may reduce phase and/or frequency offsets, for example. In one configuration, the training period 444 may comprise Very High Throughput-Long Training Field (VHT-LTF) symbols transmitted according to Institute of Electrical and Electronics Engineers (IEEE) 802.11ac specifications.

The receiving communication device 114 may estimate 808 a channel based on the one or more phase estimates and/or the pilot symbols (e.g., "training symbols"). For example, the receiving communication device 114 may use the one or more phase estimates and/or pilot symbols to obtain a channel estimate. The channel estimate may be more accurate (e.g., with reduced phase and/or frequency offsets), since it is based on the one or more phase estimates that may be more accurate (e.g., with reduced phase and/or frequency offsets). The one or more phase estimates may be more accurate since they were determined during or based on symbols received during a training period 444. For example, the channel may be estimated 808 during the training period 444. In one configuration, the training period 444 may comprise Very High Throughput-Long Training Field (VHT-LTF) symbols transmitted according to Institute of Electrical and Electronics Engineers (IEEE) 802.11ac specifications. The receiving communication device 114 may receive 810 data from the one or more sending communication devices 102, using the channel estimate to demodulate and/or decode received symbols (e.g., data symbols).

Figure 7:
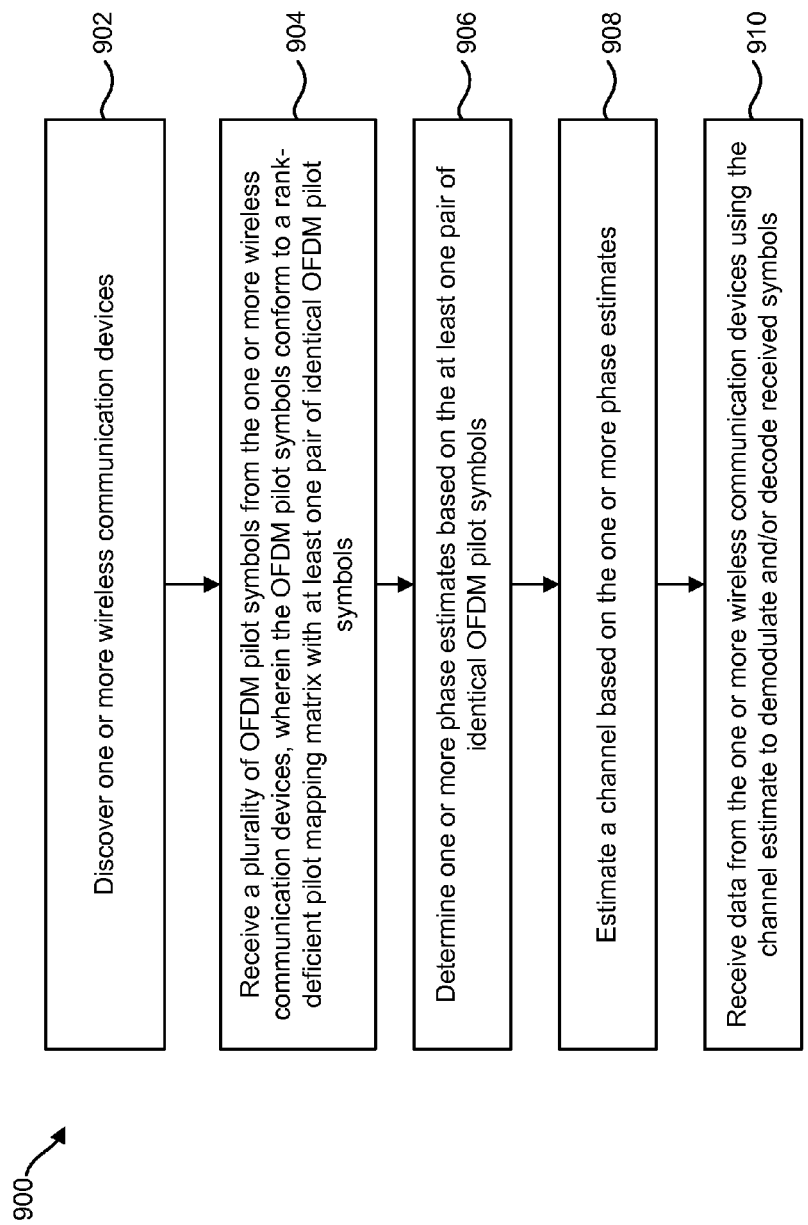
FIG. 7 is a flow diagram illustrating a more specific configuration of a method for tracking carrier phase.

FIG. 7 is a flow diagram illustrating a more specific configuration of a method 900 for tracking carrier phase. For example, FIG. 7 illustrates a method 900 similar to the method 800 illustrated in FIG. 6, but with more detail. A base station 114 may discover 902 one or more wireless communication devices 102. For example, the base station 114 may receive a message or symbol from a wireless communication device 102 indicating an attempt to communicate with the base station 114. Examples of base stations 114 include access points, cellular base stations, wireless routers, etc. The base station 114 may receive 904 a plurality of OFDM pilot symbols from the one or more wireless communication devices 102. The OFDM pilot symbols may conform to a rank-deficient pilot mapping matrix 106 with at least one pair of identical OFDM pilot symbols (or multiple of identical OFDM pilot symbols, for example). For example, OFDM pilot symbols may be received 904 using a plurality of spatial streams 124. Each row of the rank-deficient pilot mapping matrix 106 may correspond to one of the spatial streams 124 (e.g., a sequence of OFDM pilot symbols received on one of the spatial streams 124). Each column of the rank-deficient pilot mapping matrix 106 may correspond to a pilot symbol or a set of pilot symbols. At least one pair of OFDM pilot symbols (e.g., sets of OFDM pilot symbols or columns) may be the same or have the same pilot symbol values. The number of rows (e.g., sequences of OFDM pilot symbols) that have non-zero singular values (e.g., eigenvalues) or that are linearly independent may be less than the number of spatial streams or columns, indicating a pilot mapping matrix that is rank-deficient or less than full rank.

The base station 114 may determine 906 one or more phase estimates based on the at least one pair of identical OFDM pilot symbols. For example, the rank-deficient pilot mapping matrix 106 may include at least one set of repeated OFDM pilot symbols. In a 4×4 rank-deficient pilot mapping matrix 106, for example, the 1$^{st}$ and 3$^{rd}$ pilot symbols (e.g., 1$^{st}$ and 3$^{rd}$ sets or columns) may be the same. Additionally or alternatively, the 2$^{nd}$ and 4$^{th}$ pilot symbols (e.g., 2$^{nd}$ and 4$^{th}$ sets or columns) may be the same. The base station 114 may determine a correlation (e.g., cross-correlation) or phase differential of the original and repeated OFDM pilot symbols (or pilot symbol sets) to determine 906 the phase estimate. Continuing the 4×4 rank-deficient pilot mapping matrix 106 example, the base station 114 may determine a correlation (e.g., cross-correlation) or phase differential between the 1$^{st}$ and 3$^{rd}$ pilot symbols (e.g., 1$^{st}$ and 3$^{rd}$ sets or columns) and between the 2$^{nd}$ and 4$^{th}$ pilot symbols (e.g., 2$^{nd}$ and 4$^{th}$ sets or columns) to determine 906 one or more phase estimates. Determining 906 one or more phase estimates during the training period 444 may reduce phase and/or frequency offsets, for example. That is, the one or more phase estimates may be determined during a training period 444 or may be determined based on pilot symbols received during the training period 444.

The base station 114 may estimate 908 a channel based on the one or more phase estimates. For example, the base station 114 may use the one or more phase estimates to obtain a channel estimate. The channel estimate may be more accurate (e.g., with reduced phase and/or frequency offsets), since it is based on the one or more phase estimates that may be more accurate (e.g., with reduced phase and/or frequency offsets). The one or more phase estimates may be more accurate since they were determined during or based on symbols received during a training period 444. The base station 114 may receive 910 data from the one or more wireless communication devices 102, using the channel estimate to demodulate and/or decode received symbols (e.g., data symbols).

FIG. 8 is a diagram illustrating one example of a full rank pilot mapping matrix 1054. In this example, the full rank pilot mapping matrix 1054 includes pilot symbol sequences A 1056a, B 1056b, C 1056c and D 1056d. The full rank pilot mapping matrix 1054 also includes pilot symbol sets (e.g., columns) A 1058a, B 1058b, C 1058c and D 1058d. The full rank pilot mapping matrix 1054 may be sent and/or received during a training period 444. As illustrated, each pilot symbol sequence 1056a-d corresponds to a row of the full rank pilot mapping matrix 1054. Each pilot symbol sequence 1056a-d may also correspond to a spatial stream 124. In the full rank pilot mapping matrix 1054, each pilot symbol sequence 1056a-d has a non-zero singular value (e.g., eigenvalue) and/or is linearly independent, indicating rank 4. Because the rank is as large as it could possibly be in a 4×4 matrix, the pilot mapping matrix 1054 is full rank. For example, because the rank (e.g., 4) is equal to the number of spatial streams (e.g., 4), which correspond to the pilot symbol sequences 1056a-d, the pilot mapping matrix 1054 is full rank.

When the systems and methods disclosed herein are not used, for example, the full rank pilot mapping matrix 1054 may allow a receiving communication device (e.g., base station, access point, etc.) to compute a phase (e.g., phase offset) for all of the spatial streams (corresponding to the pilot symbol sequences 1056a-d). Because each of the pilot symbol sets 1058a-d are different, however, one pilot symbol set 1058 cannot be easily compared to another pilot symbol set 1058 in order to determine a phase drift or phase estimate during the training period 444.

FIG. 9 is a diagram illustrating one example of a rank-deficient pilot mapping matrix 1160 that may be used according to the systems and methods disclosed herein. In this example, the rank-deficient pilot mapping matrix 1160 includes pilot symbol sequences A 1162a, B 1162b, C 1162c and D 1162d. The rank-deficient pilot mapping matrix 1160 also includes pilot symbol sets (e.g., columns) A 1164a, B 1164b, C 1164c and D 1164d. The rank-deficient pilot mapping matrix 1160 may be sent and/or received during a training period 444. As illustrated, each pilot symbol sequence 1162a-d corresponds to a row of the rank-deficient pilot mapping matrix 1160. Each pilot symbol sequence 1162a-d may also correspond to a spatial stream 124. In the rank-deficient pilot mapping matrix 1160, one or more of the pilot symbol sequences 1162a-d may not have a non-zero singular value (e.g., eigenvalue) and/or may not be linearly independent. In the example illustrated in FIG. 9, the rank-deficient pilot mapping matrix 1160 is rank 2. Because the rank is not as large as it could possibly be in a 4×4 matrix, the pilot mapping matrix 1160 is rank-deficient. For example, because the rank (e.g., 2) is less than the number of spatial streams (e.g., 4), which correspond to the pilot symbol sequences 1162a-d, the pilot mapping matrix 1160 is rank-deficient.

According to the systems and methods disclosed herein, for example, the rank-deficient pilot mapping matrix 1160 may allow a receiving communication device (e.g., base station, access point, etc.) 114 to determine one or more phase drifts and/or phase estimates during the training period 444. As illustrated in FIG. 9, pilot symbol set A 1164a and pilot symbol set C 1164c are identical pilot symbols A 1166a. Furthermore, pilot symbol set B 1164b and pilot symbol set D 1164d are identical pilot symbols B 1166b. In other words, pilot symbol set A 1164a and C 1164c are a pair of identical pilot symbols A 1166a (with the same pilot values) and pilot symbol set B 1164b and D 1164d are a pair of identical pilot symbols B 1166b (with the same pilot values).

A receiving communication device 114 may use pairs (or multiples, for example) of identical pilot symbols 1166 to determine one or more phase estimates. For example, the receiving communication device 114 may use the pair of identical pilot symbols A 1166a to determine one or more phase estimates. More specifically, the receiving communication device 114 may determine a correlation (e.g., cross-correlation) or phase differential between pilot symbol set A 1164a and pilot symbol set C 1164c to determine a phase estimate. The receiving communication device 114 may also determine a correlation (e.g., cross-correlation) or phase differential between pilot symbol set B 1164b and pilot symbol set C 1164c (e.g., identical pilot symbols B 1166b) to determine one or more phase estimates.

More generally, when the pilot mapping matrix (e.g., rank-deficient pilot mapping matrix 1160) includes repeated pilot symbols (e.g., pilot symbol sets 1164), the phase of the repeated pilot symbols may be compared to the phase of the original pilot symbols (using correlation or a phase differential, for example) in order to determine a phase estimate. However, because the pilot mapping matrix 1160 is rank-deficient, a receiving communication device 114 may not determine a phase (e.g., phase offset) for all of the spatial streams (corresponding to the pilot symbol sequences 1162a-d). For example, the rank-deficient pilot mapping matrix 1160 illustrated in FIG. 9 is rank 2, and thus only two independent phase estimates may be determined (instead of four for a full rank pilot mapping matrix 1054, for example).

FIG. 10 is a diagram illustrating another example of a rank-deficient pilot mapping matrix 1260 that may be used according to the systems and methods disclosed herein. In this example, the rank-deficient pilot mapping matrix 1260 includes pilot symbol sequences A 1262a, B 1262b, C 1262c, D 1262d, E 1262e, F 1262f, G 1262g and H 1262h. The rank-deficient pilot mapping matrix 1260 also includes pilot symbol sets (e.g., columns) A 1264a, B 1264b, C 1264c, D 1264d, E 1264e, F 1264f, G 1264g and H 1264h. The rank-deficient pilot mapping matrix 1260 may be sent and/or received during a training period. As illustrated, each pilot symbol sequence 1262a-h corresponds to a row of the rank-deficient pilot mapping matrix 1260. Each pilot symbol sequence 1262a-h may also correspond to a spatial stream 124. In the rank-deficient pilot mapping matrix 1260, one or more of the pilot symbol sequences 1262a-h may not have a non-zero singular value (e.g., eigenvalue) and/or may not be linearly independent. Because the rank is not as large as it could possibly be in an 8×8 matrix, the pilot mapping matrix 1260 is rank-deficient. For example, because the rank is less than the number of spatial streams, which correspond to the pilot symbol sequences 1262a-h, the pilot mapping matrix 1260 is rank-deficient.

According to the systems and methods disclosed herein, for example, the rank-deficient pilot mapping matrix 1260 may allow a receiving communication device (e.g., base station, access point, etc.) 114 to determine one or more phase drifts and/or phase estimates during the training period. As illustrated in FIG. 10, pilot symbol set A 1264a and pilot symbol set E 1264e are identical pilot symbols A 1266a. Furthermore, pilot symbol set B 1264b and pilot symbol set F 1264f, pilot symbol set C 1264c and pilot symbol set G 1264g and pilot symbol set D 1264d and pilot symbol set H 1264h are respectively identical pilot symbols B 1266b, C 1266c and D 1266d. In other words, pilot symbol sets A 1264a and E 1264e, B 1264b and F 1264f, C 1264c and G 1264g and D 1264d and H 1264h are respectively pairs of identical pilot symbols A 1266a, B 1266b, C 1266c and D 1266d.

A receiving communication device 114 may use pairs (or multiples, for example) of identical pilot symbols 1266 to determine one or more phase estimates. For example, the receiving communication device 114 may use the pair of identical pilot symbols A 1266a to determine one or more phase estimates. More specifically, the receiving communication device 114 may determine a correlation (e.g., cross-correlation) or phase differential between pilot symbol set A 1264a and pilot symbol set E 1264e to determine a phase estimate. The receiving communication device 114 may also determine a correlation (e.g., cross-correlation) or phase differential between pilot symbol sets B 1264b and F 1264f, C 1264c and G 1264g and D 1264d and H 1264h to determine one or more phase estimates.

More generally, when the pilot mapping matrix (e.g., rank-deficient pilot mapping matrix 1260) includes repeated pilot symbols (e.g., pilot symbol sets 1264), the phase of the repeated pilot symbols may be compared to the phase of the original pilot symbols (using correlation or a phase differential, for example) in order to determine a phase estimate. However, because the pilot mapping matrix 1260 is rank-deficient, a receiving communication device 114 may not determine a phase (e.g., phase offset) for all of the spatial streams (corresponding to the pilot symbol sequences 1262a-h). For example, the rank-deficient pilot mapping matrix 1260 illustrated in FIG. 10 is rank 4, and thus only four independent phase estimates may be determined (instead of eight for a full rank pilot mapping matrix, for example).

FIG. 11 is a diagram illustrating another example of a rank-deficient pilot mapping matrix 1360 that may be used according to the systems and methods disclosed herein. In this example, the rank-deficient pilot mapping matrix 1360 includes pilot symbol sequences A 1362a, B 1362b, C 1362c, D 1362d, E 1362e, F 1362f, G 1362g and H 1362h. The rank-deficient pilot mapping matrix 1360 also includes pilot symbol sets (e.g., columns) A 1364a, B 1364b, C 1364c, D 1364d, E 1364e, F 1364f, G 1364g and H 1364h. The rank-deficient pilot mapping matrix 1360 may be sent and/or received during a training period. As illustrated, each pilot symbol sequence 1362*a-h* corresponds to a row of the rank-deficient pilot mapping matrix 1360. Each pilot symbol sequence 1362*a-h* may also correspond to a spatial stream 124. In the rank-deficient pilot mapping matrix 1360, one or more of the pilot symbol sequences 1362*a-h* may not have a non-zero singular value (e.g., eigenvalue) and/or may not be linearly independent. Because the rank is not as large as it could possibly be in an 8×8 matrix, the pilot mapping matrix 1360 is rank-deficient. For example, because the rank is less than the number of spatial streams, which correspond to the pilot symbol sequences 1362*a-h*, the pilot mapping matrix 1360 is rank-deficient. For instance, because the rank-deficient pilot mapping matrix 1360 illustrated in FIG. 11 is rank 4, only four independent phase estimates may be determined (instead of eight for a full rank pilot mapping matrix, for example).

According to the systems and methods disclosed herein, for example, the rank-deficient pilot mapping matrix 1360 may allow a receiving communication device (e.g., base station, access point, etc.) 114 to determine one or more phase drifts and/or phase estimates during the training period. As illustrated in FIG. 11, pilot symbol set A 1364*a* and pilot symbol set B 1364*b* are identical pilot symbols A 1366*a*. Furthermore, pilot symbol set C 1364*c* and pilot symbol set D 1364*d*, pilot symbol set E 1364*e* and pilot symbol set F 1364*f*, and pilot symbol set G 1364*g* and pilot symbol set H 1364*h* are respectively identical pilot symbols B 1366*b*, C 1366*c* and D 1366*d*. In other words, pilot symbol sets A 1364*a* and B 1364*b*, C 1364*c* and D 1364*d*, E 1364*e* and F 1364*f*, and G 1364*g* and H 1364*h* are respectively pairs of identical pilot symbols A 1366*a*, B 1366*b*, C 1366*c* and D 1366*d*.

A receiving communication device 114 may use pairs (or multiples, for example) of identical pilot symbols 1366 to determine one or more phase estimates. For example, the receiving communication device 114 may use the pair of identical pilot symbols A 1366*a* to determine one or more phase estimates. More specifically, the receiving communication device 114 may determine a correlation (e.g., cross-correlation) or phase differential between pilot symbol set A 1364*a* and pilot symbol set B 1364*b* to determine a phase estimate. The receiving communication device 114 may also determine a correlation (e.g., cross-correlation) or phase differential between pilot symbol sets C 1364*c* and D 1364*d*, E 1364*e* and F 1364*f*, and G 1364*g* and H 1364*h* to determine one or more phase estimates.

It should be noted that different rank-deficient pilot mapping matrices may be used in accordance with the systems and methods disclosed herein. In some configurations or instances, for example, it may be more beneficial to use a particular rank-deficient pilot mapping matrix. For example, if the phase error or offset is more frequently varying, then it may be more beneficial to use the rank-deficient pilot mapping matrix 1360 illustrated in FIG. 11 (than the rank-deficient pilot mapping matrix 1260 illustrated in FIG. 10), since it 1360 allows the phase estimate to be determined more rapidly. However, in the case where there is a slowly varying frequency offset, it may be more beneficial to use the rank-deficient pilot mapping matrix 1260 illustrated in FIG. 10, since the phase of symbols that are further apart may be used (to determine the phase and/or frequency offset, for example). The sending 102 and/or receiving 114 communication devices may be configured to use one particular rank-deficient pilot mapping matrix or to change rank-deficient pilot mapping matrices. The changes may be based on observed and/or predicted phase and/or frequency errors, for example.

Figure 12:
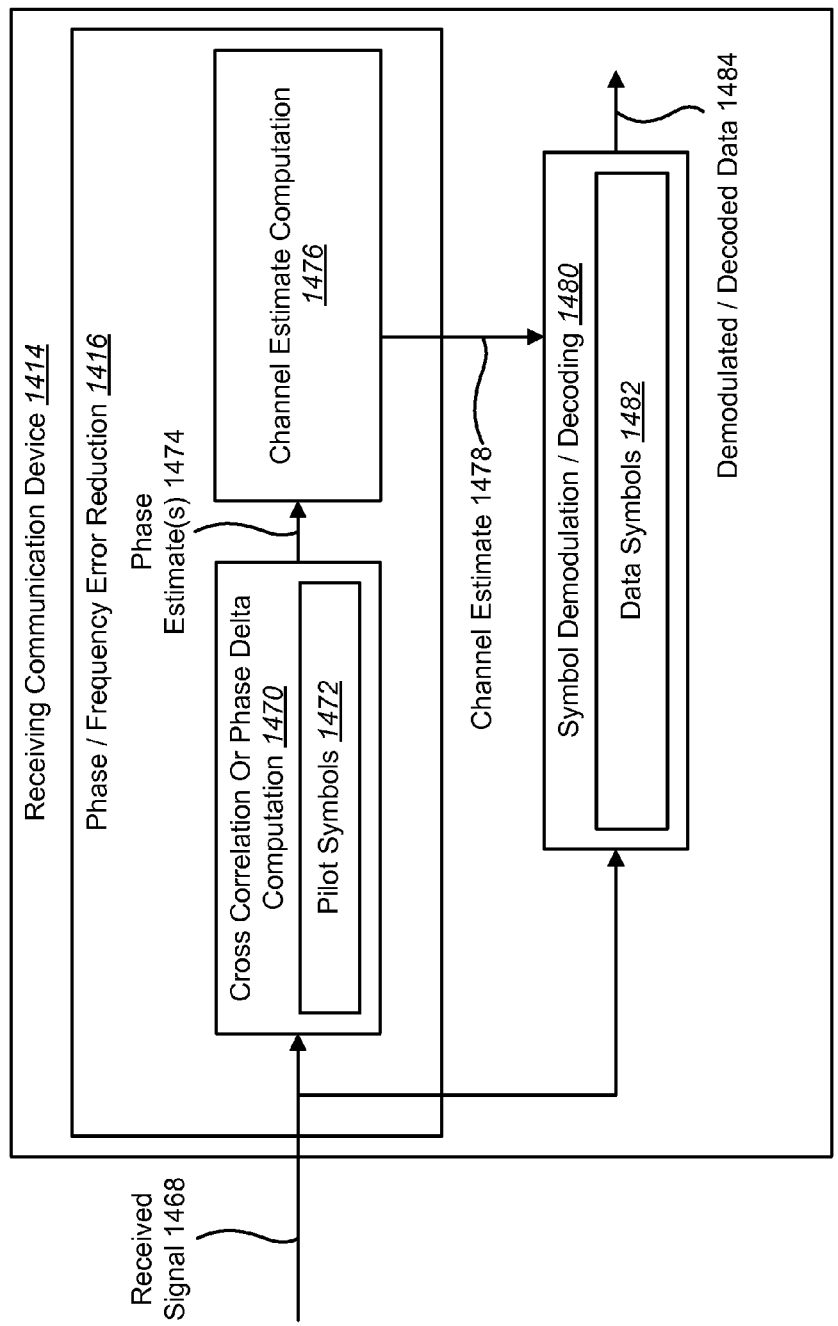
FIG. 12 is a block diagram illustrating one configuration of a receiving communication device in which systems and methods for enabling phase tracking for a communication device may be implemented.

FIG. 12 is a block diagram illustrating one configuration of a receiving communication device 1414 in which systems and methods for enabling phase tracking for a communication device may be implemented. A receiving communication device 1414 (e.g., base station, access point, wireless router, etc.) may include a phase and/or frequency error reduction module 1416 and a symbol demodulation and/or decoding module 1480. Each of the phase and/or frequency error reduction module 1416 and the symbol demodulation and/or decoding module 1480 may be implemented in hardware, software or a combination of both. The phase and/or frequency error reduction module 1416 may include a cross-correlation or phase delta computation module 1470 and/or a channel estimate computation module 1476.

The receiving communication device 1414 may receive a signal 1468. The received signal 1468 may comprise one or more symbols 126. For example, the received signal 1468 may include pilot symbols 1472 and/or data symbols 1482. The cross-correlation or phase delta computation module 1470 may use pilot symbols 1472 to compute one or more phase estimates 1474. For example, the cross-correlation or phase delta computation module 1470 may compute a cross-correlation and/or phase delta between repeated or identical pilot symbols (e.g., pilot symbol sets) in a rank-deficient pilot mapping matrix in order to determine the one or more phase estimates 1474. The one or more phase estimates 1474 may be more accurate (corresponding to reduced phase and/or frequency offsets) as a result of using repeated or identical pilot symbols within the rank-deficient pilot mapping matrix (e.g., during a training period) for their computation.

The channel estimate computation module 1476 may use the one or more phase estimates 1474 to compute a channel estimate 1478. The symbol demodulation and/or decoding module 1480 may use the channel estimate 1478 to demodulate and/or decode data symbols 1482, thus yielding demodulated and/or decoded data 1484. Examples of demodulated and/or decoded data 1484 include voice data (for a phone call, for example) and network data (e.g., Internet data, documents, files, music, video, etc.). Symbol demodulation and/or decoding may be improved as a result of using a more accurate channel estimate 1478 with reduced phase and/or frequency offsets.

Figure 13:
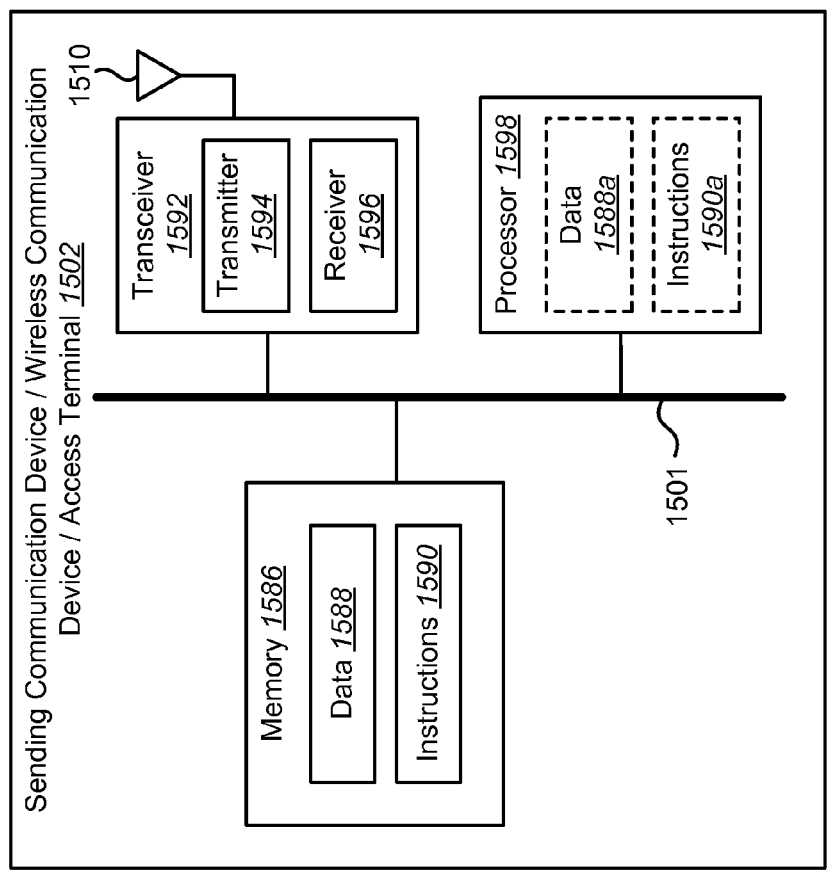
FIG. 13 illustrates certain components that may be included within a sending communication device, wireless communication device or access terminal.

FIG. 13 illustrates certain components that may be included within a sending communication device, wireless communication device or access terminal 1502. The sending communication device(s) 102 described above may be configured similarly to the sending communication device, wireless communication device or access terminal 1502 that is shown in FIG. 13.

The sending communication device, wireless communication device or access terminal 1502 includes a processor 1598. The processor 1598 may be a general purpose single- or multi-chip microprocessor (e.g., an ARM), a special purpose microprocessor (e.g., a digital signal processor (DSP)), a microcontroller, a programmable gate array, etc. The processor 1598 may be referred to as a central processing unit (CPU). Although just a single processor 1598 is shown in the sending communication device, wireless communication device or access terminal 1502 of FIG. 13, in an alternative configuration, a combination of processors (e.g., an ARM and DSP) could be used.

The sending communication device, wireless communication device or access terminal 1502 also includes memory 1586 in electronic communication with the processor 1598 (i.e., the processor 1598 can read information from and/or write information to the memory 1586). The memory 1586 may be any electronic component capable of storing electronic information. The memory 1586 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1588 and instructions 1590 may be stored in the memory 1586. The instructions 1590 may include one or more programs, routines, sub-routines, functions, procedures, code, etc. The instructions 1590 may include a single computer-readable statement or many computer-readable statements. The instructions 1590 may be executable by the processor 1598 to implement the methods 600, 700 described above. Executing the instructions 1590 may involve the use of the data 1588 that is stored in the memory 1586. FIG. 13 shows some instructions 1590a and data 1588a being loaded into the processor 1598.

The sending communication device, wireless communication device or access terminal 1502 may also include a transmitter 1594 and a receiver 1596 to allow transmission and reception of signals between the sending communication device, wireless communication device or access terminal 1502 and a remote location (e.g., a receiving communication device 114). The transmitter 1594 and receiver 1596 may be collectively referred to as a transceiver 1592. An antenna 1510 may be electrically coupled to the transceiver 1592. The sending communication device, wireless communication device or access terminal 1502 may also include (not shown) multiple transmitters, multiple receivers, multiple transceivers and/or multiple antenna.

The various components of the sending communication device, wireless communication device or access terminal 1502 may be coupled together by one or more buses, which may include a power bus, a control signal bus, a status signal bus, a data bus, etc. For simplicity, the various buses are illustrated in FIG. 13 as a bus system 1501.

Figure 14:
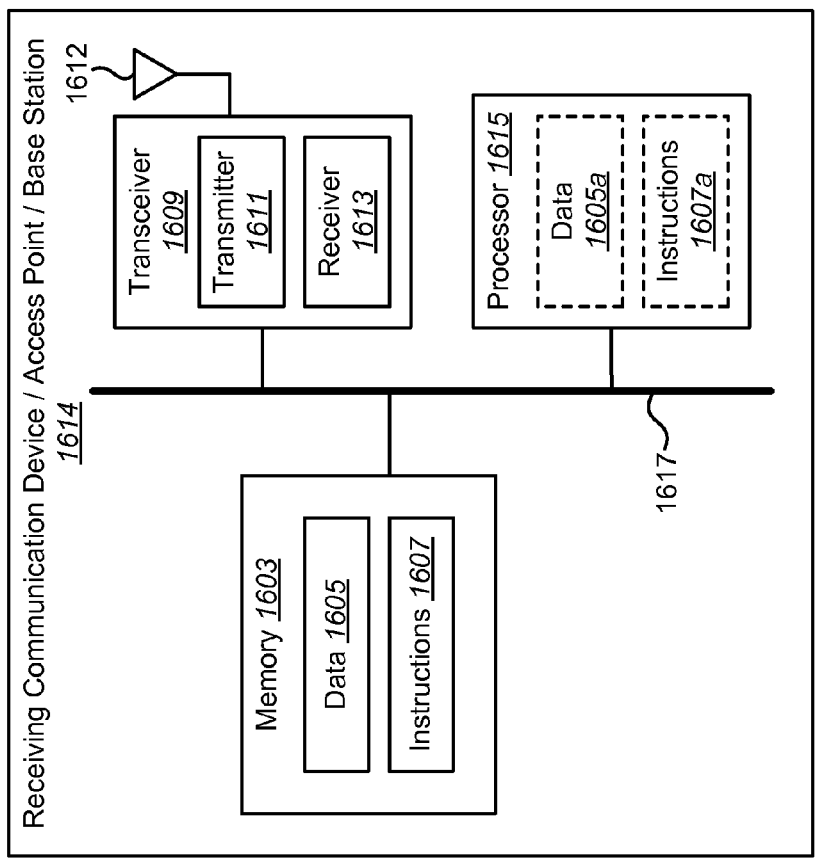
FIG. 14 illustrates certain components that may be included within a receiving communication device, access point or base station.

FIG. 14 illustrates certain components that may be included within a receiving communication device, access point or base station 1614. The receiving communication device 114 discussed previously may be configured similarly to the receiving communication device, access point or base station 1614 shown in FIG. 14.

The receiving communication device, access point or base station 1614 includes a processor 1615. The processor 1615 may be a general purpose single- or multi-chip microprocessor (e.g., an ARM), a special purpose microprocessor (e.g., a digital signal processor (DSP)), a microcontroller, a programmable gate array, etc. The processor 1615 may be referred to as a central processing unit (CPU). Although just a single processor 1615 is shown in the receiving communication device, access point or base station 1614 of FIG. 14, in an alternative configuration, a combination of processors (e.g., an ARM and DSP) could be used.

The receiving communication device, access point or base station 1614 also includes memory 1603 in electronic communication with the processor 1615 (i.e., the processor 1615 can read information from and/or write information to the memory 1603). The memory 1603 may be any electronic component capable of storing electronic information. The memory 1603 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1605 and instructions 1607 may be stored in the memory 1603. The instructions 1607 may include one or more programs, routines, sub-routines, functions, procedures, code, etc. The instructions 1607 may include a single computer-readable statement or many computer-readable statements. The instructions 1607 may be executable by the processor 1615 to implement the methods 800, 900 described above. Executing the instructions 1607 may involve the use of the data 1605 that is stored in the memory 1603. FIG. 14 shows some instructions 1607a and data 1605a being loaded into the processor 1615.

The receiving communication device, access point or base station 1614 may also include a transmitter 1611 and a receiver 1613 to allow transmission and reception of signals between the receiving communication device, access point or base station 1614 and a remote location (e.g., a sending communication device 102). The transmitter 1611 and receiver 1613 may be collectively referred to as a transceiver 1609. An antenna 1612 may be electrically coupled to the transceiver 1609. The receiving communication device, access point or base station 1614 may also include (not shown) multiple transmitters, multiple receivers, multiple transceivers and/or multiple antenna.

The various components of the receiving communication device, access point or base station 1614 may be coupled together by one or more buses, which may include a power bus, a control signal bus, a status signal bus, a data bus, etc. For simplicity, the various buses are illustrated in FIG. 14 as a bus system 1617.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device for enabling phase tracking, comprising:
a processor;
memory in electronic communication with the processor;
instructions stored in the memory, the instructions being executable to:
generate a plurality of pilot symbols, wherein the pilot symbols conform to a rank-deficient pilot mapping matrix that has less than full rank and enables comparing a phase of a repeated pilot symbol set to a phase of an original pilot symbol set to determine a phase estimate; and
transmit the plurality of pilot symbols during a training period.

2. The communication device of claim 1, wherein the instructions are further executable to transmit data or training symbols.

3. The communication device of claim 2, wherein the data or training symbols are Orthogonal Frequency-Division Multiplexing (OFDM) data or training symbols.

4. The communication device of claim 1, wherein the pilot symbols are Orthogonal Frequency-Division Multiplexing (OFDM) pilot symbols.

5. The communication device of claim 1, wherein the rank-deficient pilot mapping matrix comprises at least one pair of identical pilot symbols.

6. The communication device of claim 1, wherein the rank-deficient pilot mapping matrix is a rank-deficient pilot mapping matrix R, wherein each row corresponds to pilot symbols transmitted on a different spatial stream and each column corresponds to pilot symbols transmitted on different Orthogonal Frequency-Division Multiplexing (OFDM) symbols.

7. The communication device of claim 1, wherein the rank-deficient pilot mapping matrix for four spatial streams and four Orthogonal Frequency-Division Multiplexing (OFDM) symbols is $$\begin{bmatrix} 1 & -1 & 1 & 1 \\ 1 & -1 & 1 & 1 \\ 1 & -1 & 1 & 1 \\ 1 & -1 & 1 & 1 \end{bmatrix}.$$

8. The communication device of claim 1, wherein the rank-deficient pilot mapping matrix for six spatial streams and six Orthogonal Frequency-Division Multiplexing (OFDM) symbols is $$\begin{bmatrix} 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \end{bmatrix}.$$

9. The communication device of claim 1, wherein the rank-deficient pilot mapping matrix for eight spatial streams and eight Orthogonal Frequency-Division Multiplexing (OFDM) symbols is $$\begin{bmatrix} 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \end{bmatrix}.$$

10. The communication device of claim 1, wherein the training period comprises Very High Throughput-Long Training Field (VHT-LTF) symbols transmitted according to Institute of Electrical and Electronics Engineers (IEEE) 802.11 ac specifications.

11. The communication device of claim 1, wherein the pilot symbols are transmitted on tones reserved for pilot tones in Very High Throughput-Long Training Fields (VHT-LTFs).

12. The communication device of claim 1, wherein the communication device is a wireless communication device.

13. The communication device of claim 1, wherein the rank-deficient pilot mapping matrix has a number of linearly independent rows or columns less than a smallest dimension of the pilot mapping matrix.

14. A communication device for tracking phase, comprising:
a processor;
memory in electronic communication with the processor;
instructions stored in the memory, the instructions being executable to:
receive a plurality of pilot symbols from a sending communication device during a training period, wherein the pilot symbols conform to a rank-deficient pilot mapping matrix that has less than full rank;

compare a phase of a repeated pilot symbol set to a phase of an original pilot symbol set to determine a phase estimate;
estimate a channel based on the phase estimate and the pilot symbols; and
receive data from the sending communication device using the channel estimate.

15. The communication device of claim 14, wherein the pilot symbols are Orthogonal Frequency-Division Multiplexing (OFDM) pilot symbols.

16. The communication device of claim 14, wherein the rank-deficient pilot mapping matrix comprises at least one pair of identical pilot symbols.

17. The communication device of claim 14, wherein the rank-deficient pilot mapping matrix is a rank-deficient pilot mapping matrix R, wherein each row corresponds to pilot symbols transmitted on a different spatial stream and each column corresponds to pilot symbols transmitted on different Orthogonal Frequency-Division Multiplexing (OFDM) symbols.

18. The communication device of claim 14, wherein the phase estimate is determined based on identical pilot symbols transmitted on all spatial streams but across different Orthogonal Frequency-Division Multiplexing (OFDM) symbols.

19. The communication device of claim 16, wherein the instructions are further executable to determine the phase estimate based on the at least one pair of identical pilot symbols.

20. The communication device of claim 16, wherein the phase estimate is determined by computing a cross-correlation of the identical pilot symbols.

21. The communication device of claim 16, wherein the phase estimate is determined by computing a phase delta of the identical pilot symbols.

22. The communication device of claim 14, wherein the phase estimate is determined by computing a cross-correlation of identical pilot symbols transmitted on all spatial streams but across different Orthogonal Frequency-Division Multiplexing (OFDM) symbols.

23. The communication device of claim 14, wherein the phase estimate is determined by computing a phase delta of identical pilot symbols transmitted on all spatial streams but across different Orthogonal Frequency-Division Multiplexing (OFDM) symbols.

24. The communication device of claim 14, wherein the plurality of pilot symbols is received during a training period.

25. The communication device of claim 24, wherein the training period comprises Very High Throughput-Long Training Field (VHT-LTF) symbols transmitted according to Institute of Electrical and Electronics Engineers (IEEE) 802.11ac specifications.

26. The communication device of claim 14, wherein the phase estimate is determined during a training period.

27. The communication device of claim 26, wherein the training period comprises Very High Throughput-Long Training Field (VHT-LTF) symbols transmitted according to Institute of Electrical and Electronics Engineers (IEEE) 802.11ac specifications.

28. The communication device of claim 14, wherein the channel is estimated during a training period.

29. The communication device of claim 28, wherein the training period comprises Very High Throughput-Long Training Field (VHT-LTF) symbols transmitted according to Institute of Electrical and Electronics Engineers (IEEE) 802.11ac specifications.

30. The communication device of claim 14, wherein the communication device is a base station.

31. A method for enabling phase tracking, comprising:
generating, on a communication device, a plurality of pilot symbols, wherein the pilot symbols conform to a rank-deficient pilot mapping matrix that has less than full rank and enables comparing a phase of a repeated pilot symbol set to a phase of an original pilot symbol set to determine a phase estimate; and
transmitting the plurality of pilot symbols during a training period.

32. The method of claim 31, further comprising transmitting data or training symbols.

33. The method of claim 32, wherein the data or training symbols are Orthogonal Frequency-Division Multiplexing (OFDM) data or training symbols.

34. The method of claim 31, wherein the pilot symbols are Orthogonal Frequency-Division Multiplexing (OFDM) pilot symbols.

35. The method of claim 31, wherein the rank-deficient pilot mapping matrix comprises at least one pair of identical pilot symbols.

36. The method of claim 31, wherein the rank-deficient pilot mapping matrix is a rank-deficient pilot mapping matrix R, wherein each row corresponds to pilot symbols transmitted on a different spatial stream and each column corresponds to pilot symbols transmitted on different Orthogonal Frequency-Division Multiplexing (OFDM) symbols.

37. The method of claim 31, wherein the rank-deficient pilot mapping matrix for four spatial streams and four Orthogonal Frequency-Division Multiplexing (OFDM) symbols is $$\begin{bmatrix} 1 & -1 & 1 & 1 \\ 1 & -1 & 1 & 1 \\ 1 & -1 & 1 & 1 \\ 1 & -1 & 1 & 1 \end{bmatrix}.$$

38. The method of claim 31, wherein the rank-deficient pilot mapping matrix for six spatial streams and six Orthogonal Frequency-Division Multiplexing (OFDM) symbols is $$\begin{bmatrix} 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \\ 1 & -1 & 1 & 1 & 1 & -1 \end{bmatrix}.$$

39. The method of claim 31, wherein the rank-deficient pilot mapping matrix for eight spatial streams and eight Orthogonal Frequency-Division Multiplexing (OFDM) symbols is $$\begin{bmatrix} 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \\ 1 & -1 & 1 & 1 & 1 & -1 & 1 & 1 \end{bmatrix}.$$

40. The method of claim 31, wherein the training period comprises Very High Throughput-Long Training Field (VHT-LTF) symbols transmitted according to Institute of Electrical and Electronics Engineers (IEEE) 802.11ac specifications.

41. The method of claim 31, wherein the pilot symbols are transmitted on tones reserved for pilot tones in Very High Throughput-Long Training Fields (VHT-LTFs).

42. The method of claim 31, wherein the communication device is a wireless communication device.

43. A method for tracking phase, comprising:
receiving, by a communication device, a plurality of pilot symbols from a sending communication device during a training period, wherein the pilot symbols conform to a rank-deficient pilot mapping matrix that has less than full rank;
comparing, by the communication device, a phase of a repeated pilot symbol set to a phase of an original pilot symbol set to determine a phase estimate;
estimating a channel based on the phase estimate and the pilot symbols; and
receiving data from the sending communication device using the channel estimate.

44. The method of claim 43, wherein the pilot symbols are Orthogonal Frequency-Division Multiplexing (OFDM) pilot symbols.

45. The method of claim 43, wherein the rank-deficient pilot mapping matrix comprises at least one pair of identical pilot symbols.

46. The method of claim 43, wherein the rank-deficient pilot mapping matrix is a rank-deficient pilot mapping matrix R, wherein each row corresponds to pilot symbols transmitted on a different spatial stream and each column corresponds to pilot symbols transmitted on different Orthogonal Frequency-Division Multiplexing (OFDM) symbols.

47. The method of claim 43, wherein the phase estimate is determined based on identical pilot symbols transmitted on all spatial streams but across different Orthogonal Frequency-Division Multiplexing (OFDM) symbols.

48. The method of claim 45, further comprising determining the phase estimate based on the at least one pair of identical pilot symbols.

49. The method of claim 45, wherein the phase estimate is determined by computing a cross-correlation of the identical pilot symbols.

50. The method of claim 45, wherein the phase estimate is determined by computing a phase delta of the identical pilot symbols.

51. The method of claim 43, wherein the phase estimate is determined by computing a cross-correlation of identical pilot symbols transmitted on all spatial streams but across different Orthogonal Frequency-Division Multiplexing (OFDM) symbols.

52. The method of claim 43, wherein the phase estimate is determined by computing a phase delta of identical pilot symbols transmitted on all spatial streams but across different Orthogonal Frequency-Division Multiplexing (OFDM) symbols.

53. The method of claim 43, wherein the plurality of pilot symbols is received during a training period.

54. The method of claim 53, wherein the training period comprises Very High Throughput-Long Training Field (VHT-LTF) symbols transmitted according to Institute of Electrical and Electronics Engineers (IEEE) 802.11ac specifications.

55. The method of claim 43, wherein the phase estimate is determined during a training period.

56. The method of claim 55, wherein the training period comprises Very High Throughput-Long Training Field (VHT-LTF) symbols transmitted according to Institute of Electrical and Electronics Engineers (IEEE) 802.11ac specifications.

57. The method of claim 43, wherein the channel is estimated during a training period.

58. The method of claim 57, wherein the training period comprises Very High Throughput-Long Training Field (VHT-LTF) symbols transmitted according to Institute of Electrical and Electronics Engineers (IEEE) 802.11ac specifications.

59. The method of claim 43, wherein the communication device is a base station.

60. A computer-program product for enabling phase tracking comprising a non-transitory tangible computer-readable medium having instructions thereon, the instructions comprising:
code for causing a communication device to generate a plurality of pilot symbols, wherein the pilot symbols conform to a rank-deficient pilot mapping matrix that has less than full rank and enables comparing a phase of a repeated pilot symbol set to a phase of an original pilot symbol set to determine a phase estimate; and
code for causing the communication device to transmit the plurality of pilot symbols during a training period.

61. A computer-program product for tracking phase comprising a non-transitory tangible computer-readable medium having instructions thereon, the instructions comprising:
code for causing a communication device to receive a plurality of pilot symbols from a sending communication device during a training period, wherein the pilot symbols conform to a rank-deficient pilot mapping matrix that has less than full rank;
code for causing the communication device to compare a phase of a repeated pilot symbol set to a phase of an original pilot symbol set to determine a phase estimate;
code for causing the communication device to estimate a channel based on the phase estimate and the pilot symbols; and
code for causing the communication device to receive data from the sending communication device using the channel estimate.

62. The computer-program product of claim 61, wherein the phase estimate is determined during a training period.

63. An apparatus for enabling phase tracking, comprising:
means for generating a plurality of pilot symbols, wherein the pilot symbols conform to a rank-deficient pilot mapping matrix that has less than full rank and enables comparing a phase of a repeated pilot symbol set to a phase of an original pilot symbol set to determine a phase estimate; and
means for transmitting the plurality of pilot symbols during a training period.

64. An apparatus for tracking phase, comprising:
means for receiving a plurality of pilot symbols from a sending communication device during a training period, wherein the pilot symbols conform to a rank-deficient pilot mapping matrix that has less than full rank;
means for comparing a phase of a repeated pilot symbol set to a phase of an original pilot symbol set to determine a phase estimate;
means for estimating a channel based on the phase estimate and the pilot symbols; and
means for receiving data from the sending communication device using the channel estimate.

65. The apparatus of claim 64, wherein the phase estimate is determined during a training period.

\* \* \* \* \*